(12) United States Patent (10) Patent No.: US 12,647,345 B2
Xu et al. (45) Date of Patent: Jun. 2, 2026

(54) SPLIT INFERENCE METHOD AND APPARATUS

(71) Applicant: HUAWEI TECHNOLOGIES CO., LTD., Shenzhen (CN)

(72) Inventors: Chen Xu, Hangzhou (CN); Gongzheng Zhang, Hangzhou (CN); Jian Wang, Hangzhou (CN); Rong Li, Boulogne Billancourt (FR); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 18/827,858

(22) Filed: Sep. 9, 2024

(65) Prior Publication Data

US 2024/0430192 A1 Dec. 26, 2024

Related U.S. Application Data

(63) Continuation of application No. PCT/CN2023/080103, filed on Mar. 7, 2023.

(30) Foreign Application Priority Data

Mar. 8, 2022 (CN) .......................... 202210220494.9

(51) Int. Cl.
*H04L 45/02* (2022.01)
*H04L 45/00* (2022.01)
(52) U.S. Cl.
CPC .............. *H04L 45/08* (2013.01); *H04L 45/20* (2013.01)

(58) Field of Classification Search
CPC ................................ H04L 45/08; H04L 45/20
USPC .......................................................... 709/224
See application file for complete search history.

(56) References Cited

U.S. PATENT DOCUMENTS

2021/0357809 A1* 11/2021 Hashimoto ......... G06F 18/2163

FOREIGN PATENT DOCUMENTS

CN 109426701 A * 3/2019 ............. G06F 21/10
CN 114091672 A 2/2022

* cited by examiner

*Primary Examiner* — Zi Ye

(57) ABSTRACT

Embodiments of this application relate to the field of communication technologies, and provide a split inference method and an apparatus, to reduce communication overheads and also reduce a risk of leaking original data to a central server. The method includes: A first communication apparatus receives, from a second communication apparatus, first indication information indicating a previous-hop communication apparatus and a next-hop communication apparatus of the first communication apparatus, where the previous-hop communication apparatus and the next-hop communication apparatus each include at least one terminal device. The first communication apparatus receives data from the previous-hop communication apparatus, performs inference on the data based on a submodel corresponding to the first communication apparatus, to obtain an inference result, and sends the inference result to the next-hop communication apparatus.

20 Claims, 12 Drawing Sheets

SPLIT INFERENCE METHOD AND APPARATUS

CROSS-REFERENCE TO RELATED APPLICATIONS

This application is a continuation of International Application No. PCT/CN2023/080103, filed on Mar. 7, 2023, which claims priority to Chinese Patent Application No. 202210220494.9, filed on Mar. 8, 2022. The disclosures of the aforementioned applications are hereby incorporated by reference in their entireties.

TECHNICAL FIELD

This application relates to the field of communication technologies, and in particular, to a split inference method and an apparatus.

BACKGROUND

With the advent of the era of big models, deep learning models with massive parameters, such as a bidirectional encoder representation from transformers (BERT) model and a generative pre-training (GPT) model, can complete increasingly complex tasks and achieve better performance. An inference process of the model is limited by a device capacity. Therefore, the model is usually stored on a central server on a cloud.

Because a communication apparatus generates massive original data every day, if the communication apparatus sends the massive original data to the central server, and the central server performs inference by using the model, a large quantity of communication resources are needed to transmit the original data, and communication overheads are high. In addition, because the original data is sent to the central server, there is a risk of user privacy leakage.

Therefore, when the model is used for inference, how to reduce communication overheads and also reduce a risk of leaking the original data to the central server becomes a technical problem to be urgently resolved.

SUMMARY

In view of this, embodiments of this application provide a split inference method and an apparatus, to reduce communication overheads and also reduce a risk of leaking original data to a central server.

According to a first aspect, an embodiment of this application provides a split inference method. The method may include: A first communication apparatus may receive first indication information from a second communication apparatus, where the first indication information indicates a previous-hop communication apparatus and a next-hop communication apparatus of the first communication apparatus, and the previous-hop communication apparatus and the next-hop communication apparatus of the first communication apparatus each include at least one terminal device. The first communication apparatus receives data from the previous-hop communication apparatus of the first communication apparatus. The first communication apparatus performs inference on the data based on a submodel corresponding to the first communication apparatus, to obtain an inference result, where the submodel corresponding to the first communication apparatus is one of X submodels obtained by splitting a model based on X communication apparatuses, a communication apparatus x in the X communication apparatuses corresponds to an $x^{th}$ submodel, and the X communication apparatuses include the first communication apparatus, where x is greater than or equal to 1, and x is less than or equal to X. The first communication apparatus sends the inference result to the next-hop communication apparatus of the first communication apparatus.

Based on the first aspect, the previous-hop communication apparatus and the next-hop communication apparatus of the first communication apparatus each include the at least one terminal device. To be specific, the first communication apparatus may obtain data from the terminal device, or the first communication apparatus may send an inference result to the terminal device. Compared with a case in which a communication apparatus obtains data from a central server and sends an inference result to the central server, and the central server sends the inference result to a next communication apparatus, in this application, a quantity of times of transmitting the inference result can be reduced and communication overheads can be reduced. In addition, the first communication apparatus obtains the data from the terminal device, or sends the inference result to the terminal device, so that a risk of leaking the data to a central server can be reduced and a risk of user privacy leakage can be reduced.

In a possible design, when the first communication apparatus is a communication apparatus k in the X communication apparatuses, the previous-hop communication apparatus of the first communication apparatus is a communication apparatus k−1 in the X communication apparatuses, and the next-hop communication apparatus of the first communication apparatus is a communication apparatus k+1 in the X communication apparatuses, where k is greater than or equal to 2, and k is less than or equal to X−1.

In a possible design, when the first communication apparatus is a communication apparatus 1 in the X communication apparatuses, the previous-hop communication apparatus of the first communication apparatus is the second communication apparatus, and the next-hop communication apparatus of the first communication apparatus is a communication apparatus 2 in the X communication apparatuses. When the first communication apparatus is a communication apparatus X in the X communication apparatuses, the previous-hop communication apparatus of the first communication apparatus is a communication apparatus X−1 in the X communication apparatuses, and the next-hop communication apparatus of the first communication apparatus is the second communication apparatus.

Based on the foregoing two possible designs, when the second communication apparatus has an inference task, the second communication apparatus may directly send data to the communication apparatus 1 in the X communication apparatuses, and the X communication apparatuses complete data inference, and receive an inference result sent by the communication apparatus X in the X communication apparatuses, to complete inference. Compared with a case of transmitting the data and the inference result via the central server, in this case, communication overheads can be reduced.

In a possible design, when the first communication apparatus is a communication apparatus 1 in the X communication apparatuses, the previous-hop communication apparatus of the first communication apparatus is a third communication apparatus, and the next-hop communication apparatus of the first communication apparatus is a communication apparatus 2 in the X communication apparatuses. When the first communication apparatus is a communication apparatus X in the X communication apparatuses, the previous-hop communication apparatus of the first communication apparatus is a communication apparatus X−1 in the X communication apparatuses, and the next-hop communication apparatus of the first communication apparatus is a third communication apparatus.

Based on this possible design, when the third communication apparatus has an inference task, the third communication apparatus may directly send data to the communication apparatus 1 in the X communication apparatuses, and the X communication apparatuses complete data inference, and receive an inference result sent by the communication apparatus X in the X communication apparatuses, to complete inference. Compared with a case of transmitting the data and the inference result via the central server, in this case, communication overheads can be reduced.

In a possible design, before the first communication apparatus performs inference on the data based on the submodel corresponding to the first communication apparatus, to obtain the inference result, the method further includes: The first communication apparatus receives the submodel corresponding to the first communication apparatus from the third communication apparatus.

In a possible design, before the first communication apparatus performs inference on the data based on the submodel corresponding to the first communication apparatus, to obtain the inference result, the method further includes: The first communication apparatus receives the submodel corresponding to the first communication apparatus from the second communication apparatus.

Based on the foregoing two possible designs, when the second communication apparatus has an inference task, the second communication apparatus may split the model to obtain the submodels corresponding to the communication apparatuses, and send the submodels. When the third communication apparatus has an inference task, the third communication apparatus may split the model to obtain a submodel corresponding to each communication apparatus, and send the submodel. Alternatively, the third communication apparatus may send the model to the second communication apparatus, and the second communication apparatus splits the model to obtain a submodel corresponding to each communication apparatus, and sends the submodel.

In a possible design, before the first communication apparatus receives the first indication information from the second communication apparatus, the method further includes: The first communication apparatus sends state information of the first communication apparatus to the second communication apparatus.

In a possible design, the state information of the first communication apparatus includes one or more of the following: a size of storage space of the first communication apparatus, maximum computing power of the first communication apparatus, information about a resource occupied by the first communication apparatus, a device adjacency matrix of the first communication apparatus, a device state of the first communication apparatus, whether the first communication apparatus agrees to participate in inference, or a validity period of the state information of the first communication apparatus, where the device adjacency matrix of the first communication apparatus indicates a connection relationship between the first communication apparatus and another first communication apparatus.

Based on the foregoing two possible designs, the first communication apparatus may send the state information to the second communication apparatus, and the second communication apparatus determines, based on the received state information, the X communication apparatuses that perform an inference task, that is, may dynamically select, based on the state information, the communication apparatuses that participate in the inference task, thereby improving inference efficiency.

In a possible design, before the first communication apparatus receives the first indication information from the second communication apparatus, the method further includes: The first communication apparatus receives a device selection result from the second communication apparatus, where the device selection result indicates that the first communication apparatus is selected. The first communication apparatus sends, to the second communication apparatus, an acknowledgment of the first communication apparatus for the device selection result.

Based on this possible design, the first communication apparatus may further receive the device selection result sent by the second communication apparatus. If the first communication apparatus determines to participate in the inference task, the first communication apparatus may send an acknowledgment to the second communication apparatus. If the first communication apparatus rejects to participate in the inference task, the first communication apparatus may send a rejection to the second communication apparatus.

In a possible design, before the first communication apparatus receives the data from the previous-hop communication apparatus of the first communication apparatus, the method further includes: The first communication apparatus receives first information from the second communication apparatus, where the first information includes one or more of the following: information about a resource occupied by the previous-hop communication apparatus of the first communication apparatus, information about a resource occupied by the next-hop communication apparatus of the first communication apparatus, or time information, and the time information indicates a corresponding time range in which the first communication apparatus receives the data from the previous-hop communication apparatus of the first communication apparatus.

Based on this possible design, the first communication apparatus may further receive the first information sent by the second communication apparatus, so that the first communication apparatus communicates with the previous-hop communication apparatus based on the first information, or communicates with the next-hop communication apparatus based on the first information. When the first information includes the time information, the first communication apparatus may perform channel detection within the time range indicated by the time information, to reduce power consumption caused by the channel detection.

In a possible design, before the first communication apparatus performs inference on the data based on the submodel corresponding to the first communication apparatus, to obtain the inference result, the method further includes: The first communication apparatus obtains an encrypted submodel. The first communication apparatus decrypts the encrypted submodel, to obtain the submodel corresponding to the first communication apparatus.

Based on this possible design, encrypting the submodel can improve security protection of the submodel, and reduce a leakage risk of the submodel.

In a possible design, that the first communication apparatus receives data from the previous-hop communication apparatus of the first communication apparatus includes: The first communication apparatus receives encrypted data from the previous-hop communication apparatus of the first communication apparatus. The first communication apparatus decrypts the encrypted data to obtain the data.

Based on this possible design, encrypting the data can improve data security protection, and reduce a data leakage risk.

In a possible design, before the first communication apparatus performs inference on the data based on the submodel corresponding to the first communication apparatus, the method further includes: The first communication apparatus receives inference start signaling from the second communication apparatus, where the inference start signaling indicates the first communication apparatus to start to perform inference on the received data based on the submodel. The first communication apparatus starts, based on the inference start signaling, to perform inference on the received data based on the submodel corresponding to the first communication apparatus.

In a possible design, the first communication apparatus receives inference end signaling from the second communication apparatus, where the inference end signaling indicates the first communication apparatus to stop performing inference on the received data based on the submodel. The first communication apparatus stops, based on the inference end signaling, performing inference on the received data based on the submodel corresponding to the first communication apparatus.

Based on the foregoing two possible designs, the first communication apparatus may perform channel detection based on the inference start signaling, perform inference on detected data, and stop inference based on the inference end signaling. This provides a feasible solution for the first communication apparatus to perform an inference task.

In a possible design, that the first communication apparatus sends the inference result to the next-hop communication apparatus of the first communication apparatus includes: The first communication apparatus sends a sending request to the next-hop communication apparatus of the first communication apparatus, where the sending request is used to request to send the inference result. The first communication apparatus receives an acknowledgment for the sending request from the next-hop communication apparatus of the first communication apparatus. The first communication apparatus sends the inference result to the next-hop communication apparatus of the first communication apparatus based on the acknowledgment.

In a possible design, the first communication apparatus receives an acknowledgment for the inference result from the next-hop communication apparatus of the first communication apparatus; or the first communication apparatus receives a retransmission request from the next-hop communication apparatus of the first communication apparatus; and the first communication apparatus sends the inference result to the next-hop communication apparatus of the first communication apparatus based on the retransmission request.

Based on the foregoing two possible designs, before sending the data to the next-hop communication apparatus of the first communication apparatus, the first communication apparatus may first send the sending request. If an acknowledgment is received, the first communication apparatus may send the data to the next-hop communication apparatus of the first communication apparatus. When the next-hop communication apparatus of the first communication apparatus receives the data, if the receiving succeeds, the next-hop communication apparatus may send an acknowledgment to the first communication apparatus; or if the receiving fails, the next-hop communication apparatus may request the first communication apparatus to retransmit the data, thereby improving data transmission reliability.

In a possible design, that the first communication apparatus receives data from the previous-hop communication apparatus of the first communication apparatus includes: The first communication apparatus receives a sending request from the previous-hop communication apparatus of the first communication apparatus, where the sending request is used to request to send the data. The first communication apparatus sends, to the previous-hop communication apparatus of the first communication apparatus, an acknowledgment of the first communication apparatus for the sending request. The first communication apparatus receives the data from the previous-hop communication apparatus of the first communication apparatus.

In a possible design, after the first communication apparatus receives the data from the previous-hop communication apparatus of the first communication apparatus, the method further includes: The first communication apparatus determines a metric value of the data based on the data. The first communication apparatus sends, to the previous-hop communication apparatus of the first communication apparatus, an acknowledgment of the first communication apparatus for the data based on the metric value; or the first communication apparatus sends a retransmission request to the previous-hop communication apparatus of the first communication apparatus based on the metric value. The first communication apparatus receives the data from the previous-hop communication apparatus of the first communication apparatus.

Based on the foregoing two possible designs, after receiving the sending request, the first communication apparatus may send an acknowledgment to the previous-hop communication apparatus of the first communication apparatus, to receive the data. If the receiving succeeds, the first communication apparatus may send an acknowledgment to the previous-hop communication apparatus of the first communication apparatus. If the receiving fails, the first communication apparatus may request the previous-hop communication apparatus of the first communication apparatus to retransmit the data, thereby improving data transmission reliability.

In a possible design, the first communication apparatus sends channel measurement configuration information to a communication apparatus communicatively connected to the first communication apparatus. The first communication apparatus broadcasts a reference signal specific to the first communication apparatus. The first communication apparatus receives channel state information from the communication apparatus communicatively connected to the first communication apparatus. The first communication apparatus updates the device adjacency matrix of the first communication apparatus based on the channel state information.

In a possible design, the channel measurement configuration information includes one or more of the following: a frequency band occupied by the first communication apparatus, reference signal configuration information, a channel state feedback manner, or a time-frequency resource occupied for channel state feedback.

Based on the foregoing two possible designs, the first communication apparatus may further update the device adjacency matrix, and include an updated device adjacency matrix in the state information when sending the state information to the second communication apparatus, so that the second communication apparatus selects, based on the received state information, a more appropriate communication apparatus to participate in an inference task, thereby improving inference efficiency.

According to a second aspect, an embodiment of this application provides a communication apparatus. The communication apparatus may implement functions performed by the first communication apparatus in the first aspect or the possible designs of the first aspect. The functions may be implemented by hardware executing corresponding software. The hardware or the software includes one or more modules corresponding to the functions, for example, a transceiver module and a processing module. The transceiver module is configured to receive first indication information from a second communication apparatus, where the first indication information indicates a previous-hop communication apparatus and a next-hop communication apparatus of the first communication apparatus, and the previous-hop communication apparatus and the next-hop communication apparatus of the first communication apparatus each include at least one terminal device. The transceiver module is further configured to receive data from the previous-hop communication apparatus of the first communication apparatus. The processing module is configured to perform inference on the data based on a submodel corresponding to the first communication apparatus, to obtain an inference result, where the submodel corresponding to the first communication apparatus is one of X submodels obtained by splitting a model based on X communication apparatuses, a communication apparatus x in the X communication apparatuses corresponds to an $x^{th}$ submodel, and the X communication apparatuses include the first communication apparatus, where x is greater than or equal to 1, and x is less than or equal to X. The transceiver module is further configured to send the inference result to the next-hop communication apparatus of the first communication apparatus.

In a possible design, when the first communication apparatus is a communication apparatus k in the X communication apparatuses, the previous-hop communication apparatus of the first communication apparatus is a communication apparatus k−1 in the X communication apparatuses, and the next-hop communication apparatus of the first communication apparatus is a communication apparatus k+1 in the X communication apparatuses, where k is greater than or equal to 2, and k is less than or equal to X−1.

In a possible design, when the first communication apparatus is a communication apparatus 1 in the X communication apparatuses, the previous-hop communication apparatus of the first communication apparatus is the second communication apparatus, and the next-hop communication apparatus of the first communication apparatus is a communication apparatus 2 in the X communication apparatuses. When the first communication apparatus is a communication apparatus X in the X communication apparatuses, the previous-hop communication apparatus of the first communication apparatus is a communication apparatus X−1 in the X communication apparatuses, and the next-hop communication apparatus of the first communication apparatus is the second communication apparatus.

In a possible design, when the first communication apparatus is a communication apparatus 1 in the X communication apparatuses, the previous-hop communication apparatus of the first communication apparatus is a third communication apparatus, and the next-hop communication apparatus of the first communication apparatus is a communication apparatus 2 in the X communication apparatuses. When the first communication apparatus is a communication apparatus X in the X communication apparatuses, the previous-hop communication apparatus of the first communication apparatus is a communication apparatus X−1 in the X communication apparatuses, and the next-hop communication apparatus of the first communication apparatus is the third communication apparatus.

In a possible design, the transceiver module is further configured to: before the processing module performs inference on the data based on the submodel corresponding to the first communication apparatus, to obtain the inference result, receive the submodel corresponding to the first communication apparatus from the third communication apparatus.

In a possible design, the transceiver module is further configured to: before the processing module performs inference on the data based on the submodel corresponding to the first communication apparatus, to obtain the inference result, receive the submodel corresponding to the first communication apparatus from the second communication apparatus.

In a possible design, the transceiver module is further configured to: before receiving the first indication information from the second communication apparatus, send state information of the first communication apparatus to the second communication apparatus.

In a possible design, the state information of the first communication apparatus includes one or more of the following: a size of storage space of the first communication apparatus, maximum computing power of the first communication apparatus, information about a resource occupied by the first communication apparatus, a device adjacency matrix of the first communication apparatus, a device state of the first communication apparatus, whether the first communication apparatus agrees to participate in inference, or a validity period of the state information of the first communication apparatus, where the device adjacency matrix of the first communication apparatus indicates a connection relationship between the first communication apparatus and another first communication apparatus.

In a possible design, the transceiver module is further configured to: before receiving the first indication information from the second communication apparatus, receive a device selection result from the second communication apparatus, where the device selection result indicates that the first communication apparatus is selected. The transceiver module is further configured to send, to the second communication apparatus, acknowledgment of the first communication apparatus for the device selection result.

In a possible design, the transceiver module is further configured to: before receiving the data from the previous-hop communication apparatus of the first communication apparatus, receive first information from the second communication apparatus, where the first information includes one or more of the following: information about a resource occupied by the previous-hop communication apparatus of the first communication apparatus, information about a resource occupied by the next-hop communication apparatus of the first communication apparatus, or time information, and the time information indicates a corresponding time range in which the first communication apparatus receives the data from the previous-hop communication apparatus of the first communication apparatus.

In a possible design, before the processing module performs inference on the data based on the submodel corresponding to the first communication apparatus, to obtain the inference result, the transceiver module is further configured to obtain an encrypted submodel; and the processing module decrypts the encrypted submodel, to obtain the submodel corresponding to the first communication apparatus.

In a possible design, the transceiver module receives encrypted data from the previous-hop communication apparatus of the first communication apparatus. The processing module decrypts the encrypted data to obtain the data.

In a possible design, before the processing module performs inference on the data based on the submodel corresponding to the first communication apparatus, the transceiver module is further configured to receive inference start signaling from the second communication apparatus, where the inference start signaling indicates the first communication apparatus to start to perform inference on the received data based on the submodel. The processing module starts, based on the inference start signaling, to perform inference based on the submodel corresponding to the first communication apparatus.

In a possible design, the transceiver module is further configured to receive inference end signaling from the second communication apparatus, where the inference end signaling indicates the first communication apparatus to stop performing inference on the received data based on the submodel. The processing module stops, based on the inference end signaling, performing inference on the received data based on the submodel corresponding to the first communication apparatus.

In a possible design, the transceiver module sends a sending request to the next-hop communication apparatus of the first communication apparatus, where the sending request is used to request to send the inference result. The transceiver module is further configured to receive an acknowledgment for the sending request from the next-hop communication apparatus of the first communication apparatus. The transceiver module sends the inference result to the next-hop communication apparatus of the first communication apparatus based on the acknowledgment.

In a possible design, the transceiver module is further configured to receive an acknowledgment for the inference result from the next-hop communication apparatus of the first communication apparatus; or configured to receive a retransmission request from the next-hop communication apparatus of the first communication apparatus; and the transceiver module is further configured to send the inference result to the next-hop communication apparatus of the first communication apparatus based on the retransmission request.

In a possible design, the transceiver module receives a sending request from the previous-hop communication apparatus of the first communication apparatus, where the sending request is used to request to send the data. The transceiver module further sends, to the previous-hop communication apparatus of the first communication apparatus, an acknowledgment of the first communication apparatus for the sending request; and receives the data from the previous-hop communication apparatus of the first communication apparatus.

In a possible design, after the transceiver module receives the data from the previous-hop communication apparatus of the first communication apparatus, the processing module further determines a metric value of the data based on the data. The transceiver module is further configured to: send, to the previous-hop communication apparatus of the first communication apparatus, an acknowledgment of the first communication apparatus for the data based on the metric value; or send a retransmission request to the previous-hop communication apparatus of the first communication apparatus based on the metric value. The transceiver module is further configured to receive the data from the previous-hop communication apparatus of the first communication apparatus.

In a possible design, the transceiver module is further configured to send channel measurement configuration information to a communication apparatus communicatively connected to the first communication apparatus. The transceiver module is further configured to: broadcast a reference signal specific to the first communication apparatus; and receive channel state information from the communication apparatus communicatively connected to the first communication apparatus. The processing module updates the device adjacency matrix of the first communication apparatus based on the channel state information.

In a possible design, the channel measurement configuration information includes one or more of the following: a frequency band occupied by the first communication apparatus, reference signal configuration information, a channel state feedback manner, or a time-frequency resource occupied for channel state feedback.

It should be noted that, for a specific implementation of the communication apparatus in the second aspect, refer to behavior functions of the first communication apparatus in the split inference method according to any one of the first aspect or the possible designs of the first aspect.

According to a third aspect, an embodiment of this application provides a communication apparatus. The first communication apparatus may be a first communication apparatus or a chip or a system-on-a-chip in the first communication apparatus. The communication apparatus may implement functions performed by the first communication apparatus in the foregoing aspects or the possible designs. The functions may be implemented by hardware. In a possible design, the communication apparatus may include a transceiver and a processor. The transceiver and the processor may be configured to support the communication apparatus in implementing the functions in any one of the first aspect or the possible designs of the first aspect. For example, the transceiver may be configured to receive first indication information from a second communication apparatus, where the first indication information indicates a previous-hop communication apparatus and a next-hop communication apparatus of the first communication apparatus, and the previous-hop communication apparatus and the next-hop communication apparatus of the first communication apparatus each include at least one terminal device. The transceiver may be further configured to receive data from the previous-hop communication apparatus of the first communication apparatus. The processor may be configured to perform inference on the data based on a submodel corresponding to the first communication apparatus, to obtain an inference result, where the submodel corresponding to the first communication apparatus is one of X submodels obtained by splitting a model based on X communication apparatuses, a communication apparatus x in the X communication apparatuses corresponds to an $x^{th}$ submodel, and the X communication apparatuses include the first communication apparatus, where x is greater than or equal to 1, and x is less than or equal to X. The transceiver may be further configured to send the inference result to the next-hop communication apparatus of the first communication apparatus. In another possible design, the communication apparatus may further include a memory. The memory is configured to store computer-executable instructions and data of the communication apparatus. When the communication apparatus is run, the transceiver and the processor execute the computer-executable instructions stored in the memory, so that the communication apparatus performs the split inference method according to any one of the first aspect or the possible designs of the first aspect.

For a specific implementation of the communication apparatus in the third aspect, refer to behavior functions of the first communication apparatus in the split inference method according to any one of the first aspect or the possible designs of the first aspect.

According to a fourth aspect, an embodiment of this application provides a split inference method. The method may include: A second communication apparatus generates first indication information, where the first indication information indicates a previous-hop communication apparatus and a next-hop communication apparatus of a first communication apparatus, the previous-hop communication apparatus and the next-hop communication apparatus of the first communication apparatus each include at least one terminal device, the first communication apparatus is one of X communication apparatuses, a communication apparatus x in the X communication apparatuses corresponds to an $x^{th}$ submodel in X submodels, the X submodels are obtained by splitting a model, and the submodel is used for data inference, where x is greater than or equal to 1, and x is less than or equal to X. The second communication apparatus sends the first indication information to the first communication apparatus.

Based on the fourth aspect, the previous-hop communication apparatus and the next-hop communication apparatus of the first communication apparatus each include the at least one terminal device. To be specific, the first communication apparatus may obtain data from the terminal device, or the first communication apparatus may send an inference result to the terminal device. Compared with a case in which a communication apparatus obtains data from a central server and sends an inference result to the central server, and the central server sends the inference result to a next communication apparatus, in this application, a quantity of times of transmitting the inference result can be reduced and communication overheads can be reduced. In addition, the first communication apparatus obtains the data from the terminal device, or sends the inference result to the terminal device, so that a risk of leaking the data to a central server can be reduced and a risk of user privacy leakage can be reduced.

In a possible design, before the second communication apparatus generates the first indication information, the method further includes: The second communication apparatus determines the X communication apparatuses.

Based on this possible design, when the second communication apparatus has an inference task, the second communication apparatus may schedule the X communication apparatuses to jointly complete the inference task.

In a possible design, that the second communication apparatus determines the X communication apparatuses includes: The second communication apparatus receives inference information from a third communication apparatus. The second communication apparatus determines the X communication apparatuses based on the inference information.

In a possible design, the inference information includes one or more of the following: a data amount size, data precision, a quantity of layers of the model, an input/output dimension of the model, floating-point operations of each layer of the model, a maximum split amount of the model, a type of an inference task, or a priority of the inference task, where the type of the inference task includes a model type and a data type, the model type is private or public, and the data type is private or public.

Based on the foregoing two possible designs, when the third communication apparatus has an inference task, the second communication apparatus may schedule, based on the inference information sent by the third communication apparatus, the X communication apparatuses to jointly complete the inference task of the third communication apparatus.

In a possible design, the second communication apparatus sends second indication information to the third communication apparatus, where the second indication information indicates a communication apparatus 1 and a communication apparatus X in the X communication apparatuses.

Based on this possible design, when the third communication apparatus has an inference task, the second communication apparatus sends the second indication information to the third communication apparatus, and the third communication apparatus may send data to the communication apparatus 1 based on the second indication information, and receive an inference result from the communication apparatus X to complete inference. Compared with a case of transmitting the data and the inference result via the central server, in this case, communication overheads can be reduced.

In a possible design, the second communication apparatus obtains state information of M communication apparatuses, where the state information indicates whether the first communication apparatus supports inference, X is greater than or equal to 1, and X is less than or equal to M. The second communication apparatus selects the X communication apparatuses based on the state information of the M communication apparatuses.

In a possible design, the second communication apparatus broadcasts a state information reporting request, where the state information reporting request is used to request the first communication apparatus to report the state information. The second communication apparatus receives the state information from the M communication apparatuses.

In a possible design, state information of the first communication apparatus includes one or more of the following: a size of storage space of the first communication apparatus, maximum computing power of the first communication apparatus, information about a resource occupied by the first communication apparatus, a device adjacency matrix of the first communication apparatus, a device state of the first communication apparatus, whether the first communication apparatus agrees to participate in inference, or a validity period of the state information of the first communication apparatus, where the device adjacency matrix of the first communication apparatus indicates a connection relationship between the first communication apparatus and another first communication apparatus.

Based on the foregoing three possible designs, the second communication apparatus may determine, based on the state information, the X communication apparatuses that perform an inference task, that is, may dynamically select, based on the state information, the communication apparatuses that participate in the inference task, thereby improving inference efficiency.

In a possible design, that the second communication apparatus sends the first indication information to the first communication apparatus includes: The second communication apparatus broadcasts a device selection result, where the device selection result indicates the X communication apparatuses. The second communication apparatus receives an acknowledgment of the first communication apparatus for the device selection result. The second communication apparatus sends the first indication information to the first communication apparatus based on the acknowledgment.

Based on this possible design, after determining the X communication apparatuses, the second communication apparatus may further broadcast the device selection result. If the selected communication apparatus determines to participate in an inference task, the selected communication apparatus may send an acknowledgment to the second communication apparatus.

In a possible design, the second communication apparatus splits the model to obtain the X submodels. The second communication apparatus respectively sends the submodels corresponding to the communication apparatuses to the X communication apparatuses.

In a possible design, that the second communication apparatus splits the model to obtain the X submodels includes: The second communication apparatus broadcasts a device selection result, where the device selection result indicates the X communication apparatuses. The second communication apparatus receives acknowledgments of the X communication apparatuses for the device selection result. The second communication apparatus splits the model based on the acknowledgments, to obtain the X submodels.

Based on the foregoing two possible designs, when the second communication apparatus has an inference task, the second communication apparatus may split the model to obtain the submodels corresponding to the communication apparatuses, and send the submodels.

In a possible design, that the second communication apparatus splits the model to obtain the X submodels includes: The second communication apparatus receives the model from the third communication apparatus; and the second communication apparatus splits the model to obtain the X submodels. Alternatively, the second communication apparatus receives identification information of the model from the third communication apparatus; the second communication apparatus determines the model based on the identification information of the model; and the second communication apparatus splits the model to obtain the X submodels.

In a possible design, the second communication apparatus sends submodel information corresponding to the X communication apparatuses to the third communication apparatus, where the submodel information indicates a quantity of model layers corresponding to the submodel.

Based on the foregoing two possible designs, when the third communication apparatus has an inference task, the second communication apparatus may split the model based on the model sent by the third communication apparatus, to obtain the submodels corresponding to the communication apparatuses, and send the submodels. Alternatively, the second communication apparatus may determine, based on the inference information, the submodel information corresponding to the communication apparatuses, and the second communication apparatus splits the model based on the submodel information, to obtain the submodels corresponding to the communication apparatuses, and sends the submodels.

In a possible design, the second communication apparatus sends data to the communication apparatus 1 in the X communication apparatuses. The second communication apparatus receives an inference result from the communication apparatus X in the X communication apparatuses.

In a possible design, the second communication apparatus receives data from the third communication apparatus. The second communication apparatus sends the data to the communication apparatus 1 in the X communication apparatuses.

Based on the foregoing two possible designs, when the second communication apparatus has an inference task, the second communication apparatus may send the data to the communication apparatus, and receive the inference result from the communication apparatus X, to complete inference. When the third communication apparatus has an inference task, and the second communication apparatus receives the data from the third communication apparatus, the second communication apparatus may forward the data to the communication apparatus 1, and the communication apparatus 1 performs inference on the data of the second communication apparatus, to complete the inference task of the third communication apparatus.

In a possible design, the second communication apparatus sends first information to the first communication apparatus, where the first information includes one or more of the following: information about a resource occupied by the previous-hop communication apparatus of the first communication apparatus, information about a resource occupied by the next-hop communication apparatus of the first communication apparatus, or time information, and the time information indicates a corresponding time range in which the first communication apparatus receives data from the previous-hop communication apparatus of the first communication apparatus.

Based on this possible design, the second communication apparatus may further send the first information to the first communication apparatus, and the first communication apparatus may communicate with the previous-hop communication apparatus or the next-hop communication apparatus based on the first information. When the first information includes the time information, the first communication apparatus may further perform channel detection based on the time range indicated by the time information, to reduce power consumption caused by the channel detection.

In a possible design, when the state information of the first communication apparatus includes the validity period of the state information of the first communication apparatus, the method further includes: When an amount of state information that is of the first communication apparatus and whose validity period expires is greater than or equal to a first threshold, the second communication apparatus broadcasts a state information report request; and the second communication apparatus receives the state information from the M communication apparatuses.

Based on this possible design, when the amount of state information whose validity period expires is greater than or equal to the first threshold, the second communication apparatus may re-obtain the state information of the communication apparatus, and select, based on the re-obtained state information of the communication apparatus, a more appropriate communication apparatus to participate in an inference task, thereby improving inference efficiency.

In a possible design, when the second communication apparatus receives a rejection of at least one of the X communication apparatuses for the device selection result, the second communication apparatus reselects the X communication apparatuses, and rebroadcasts the device selection result.

Based on this possible design, when the selected communication apparatus rejects to participate in an inference task, the second communication apparatus may reselect a more appropriate communication apparatus to participate in the inference task, thereby improving inference efficiency.

In a possible design, the second communication apparatus broadcasts inference start signaling, where the inference start signaling indicates the first communication apparatus to start to perform inference on the received data based on the submodel.

In a possible design, the second communication apparatus broadcasts inference end signaling, where the inference end signaling indicates the first communication apparatus to stop performing inference on the received data based on the submodel.

Based on the foregoing two possible designs, the second communication apparatus may further indicate, by using the inference start signaling, the X communication apparatuses to start inference, and indicate, by using the inference end signaling, the X communication apparatuses to stop inference. This provides a feasible solution for starting and ending an inference task.

According to a fifth aspect, an embodiment of this application provides a communication apparatus. The communication apparatus may implement functions performed by the second communication apparatus in the fourth aspect or the possible designs of the fourth aspect. The functions may be implemented by hardware executing corresponding software. The hardware or the software includes one or more modules corresponding to the functions, for example, a transceiver module and a processing module. The processing module is configured to generate first indication information, where the first indication information indicates a previous-hop communication apparatus and a next-hop communication apparatus of a first communication apparatus, the previous-hop communication apparatus and the next-hop communication apparatus of the first communication apparatus each include at least one terminal device, the first communication apparatus is one of X communication apparatuses, a communication apparatus x in the X communication apparatuses corresponds to an $x^{th}$ submodel in X submodels, the X submodels are obtained by splitting a model, and the submodel is used for data inference, where x is greater than or equal to 1, and x is less than or equal to X. The transceiver module is configured to send the first indication information to the first communication apparatus.

In a possible design, the processing module is further configured to determine the X communication apparatuses before generating the first indication information.

In a possible design, that the processing module determines the X communication apparatuses includes: The transceiver module receives inference information from a third communication apparatus. The processing module determines the X communication apparatuses based on the inference information.

In a possible design, the inference information includes one or more of the following: a data amount size, data precision, a quantity of layers of the model, an input/output dimension of the model, floating-point operations of each layer of the model, a maximum split amount of the model, a type of an inference task, or a priority of the inference task, where the type of the inference task includes a model type and a data type, the model type is private or public, and the data type is private or public.

In a possible design, the transceiver module is further configured to send second indication information to the third communication apparatus, where the second indication information indicates a communication apparatus 1 and a communication apparatus X in the X communication apparatuses.

In a possible design, the transceiver module is further configured to obtain state information of M communication apparatuses, where the state information indicates whether the first communication apparatus supports inference, X is greater than or equal to 1, and X is less than or equal to M. The processing module is configured to select the X communication apparatuses based on the state information of the M communication apparatuses.

In a possible design, the transceiver module is further configured to broadcast a state information reporting request, where the state information reporting request is used to request the first communication apparatus to report the state information. The transceiver module is further configured to receive the state information from the M communication apparatuses.

In a possible design, state information of the first communication apparatus includes one or more of the following: a size of storage space of the first communication apparatus, maximum computing power of the first communication apparatus, information about a resource occupied by the first communication apparatus, a device adjacency matrix of the first communication apparatus, a device state of the first communication apparatus, whether the first communication apparatus agrees to participate in inference, or a validity period of the state information of the first communication apparatus, where the device adjacency matrix of the first communication apparatus indicates a connection relationship between the first communication apparatus and another first communication apparatus.

In a possible design, the transceiver module broadcasts a device selection result, where the device selection result indicates the X communication apparatuses. The transceiver module is further configured to receive an acknowledgment of the first communication apparatus for the device selection result. The transceiver module is further configured to send the first indication information to the first communication apparatus based on the acknowledgment.

In a possible design, the processing module is further configured to split the model to obtain the X submodels. The transceiver module is further configured to respectively send the submodels corresponding to the communication apparatuses to the X communication apparatuses.

In a possible design, that the processing module splits the model to obtain the X submodels includes: The transceiver module broadcasts a device selection result, where the device selection result indicates the X communication apparatuses. The transceiver module further receives acknowledgments of the X communication apparatuses for the device selection result. The processing module splits the model based on the acknowledgments, to obtain the X submodels.

In a possible design, that the processing module splits the model to obtain the X submodels includes: The transceiver module receives the model from the third communication apparatus; and the processing module splits the model to obtain the X submodels. Alternatively, the transceiver module receives identification information of the model from the third communication apparatus; and the processing module determines the model based on the identification information of the model, and splits the module to obtain the X submodels.

In a possible design, the transceiver module is further configured to send submodel information corresponding to the X communication apparatuses to the third communication apparatus, where the submodel information indicates a quantity of model layers corresponding to the submodel.

In a possible design, the transceiver module is further configured to: send data to the communication apparatus 1 in the X communication apparatuses; and further receive an inference result from the communication apparatus X in the X communication apparatuses.

In a possible design, the transceiver module is further configured to: receive data from the third communication apparatus, and send the data to the communication apparatus 1 in the X communication apparatuses.

In a possible design, the transceiver module is further configured to send first information to the first communication apparatus, where the first information includes one or more of the following: information about a resource occupied by the previous-hop communication apparatus of the first communication apparatus, information about a resource occupied by the next-hop communication apparatus of the first communication apparatus, or time information, and the time information indicates a corresponding time range in which the first communication apparatus receives data from the previous-hop communication apparatus of the first communication apparatus.

In a possible design, when the state information of the first communication apparatus includes the validity period of the state information of the first communication apparatus, and an amount of state information that is of the first communication apparatus and whose validity period expires is greater than or equal to a first threshold, the transceiver module broadcasts a state information report request, and receives the state information from the M communication apparatuses.

In a possible design, when receiving a rejection of at least one of the X communication apparatuses for the device selection result, the transceiver module reselects the X communication apparatuses, and rebroadcasts the device selection result.

In a possible design, the transceiver module is further configured to broadcast inference start signaling, where the inference start signaling indicates the first communication apparatus to start to perform inference on the received data based on the submodel.

In a possible design, the transceiver module is further configured to broadcast inference end signaling, where the inference end signaling indicates the first communication apparatus to stop performing inference on the received data based on the submodel.

It should be noted that, for a specific implementation of the communication apparatus in the fifth aspect, refer to behavior functions of the second communication apparatus in the split inference method according to any one of the fourth aspect or the possible designs of the fourth aspect.

According to a sixth aspect, an embodiment of this application provides a communication apparatus. The communication apparatus may be a chip or a system-on-a-chip in a second communication apparatus. The communication apparatus may implement functions performed by the second communication apparatus in the foregoing aspects or the possible designs. The functions may be implemented by hardware. In a possible design, the communication apparatus may include a transceiver and a processor. The transceiver and the processor may be configured to support the communication apparatus in implementing the functions in any one of the fourth aspect or the possible designs of the fourth aspect. For example, the processor may be configured to generate first indication information, where the first indication information indicates a previous-hop communication apparatus and a next-hop communication apparatus of a first communication apparatus, the previous-hop communication apparatus and the next-hop communication apparatus of the first communication apparatus each include at least one terminal device, the first communication apparatus is one of X communication apparatuses, a communication apparatus x in the X communication apparatuses corresponds to an $x^{th}$ submodel in X submodels, the X submodels are obtained by splitting a model, and the submodel is used for data inference, where x is greater than or equal to 1, and x is less than or equal to X. The transceiver may be configured to send the first indication information to the first communication apparatus. In another possible design, the communication apparatus may further include a memory. The memory is configured to store computer-executable instructions and data that are necessary for the communication apparatus. When the communication apparatus is run, the transceiver and the processor execute the computer-executable instructions stored in the memory, so that the communication apparatus performs the split inference method according to any one of the fourth aspect or the possible designs of the fourth aspect.

For a specific implementation of the communication apparatus in the sixth aspect, refer to behavior functions of the second communication apparatus in the split inference method according to any one of the fourth aspect or the possible designs of the fourth aspect.

According to a seventh aspect, an embodiment of this application provides a split inference method. The method may include: A third communication apparatus sends inference information to a second communication apparatus. The third communication apparatus receives second indication information from the second communication apparatus, where the second indication information indicates a communication apparatus 1 and a communication apparatus X in X communication apparatuses, the X communication apparatuses are determined by the second communication apparatus based on the inference information, and X is greater than or equal to 1. The third communication apparatus sends data to the communication apparatus 1. The third communication apparatus receives an inference result from the communication apparatus X.

Based on the seventh aspect, when the third communication apparatus has an inference task, the second communication apparatus may schedule the X communication apparatuses to perform the inference task of the third communication apparatus. Because the third communication apparatus and the X communication apparatuses are all terminal devices, each terminal device may directly obtain data from a previous-hop terminal device, and send, to a next-hop terminal device, an inference result obtained by the terminal device through inference. Compared with a case in which a terminal device obtains data from a central server and sends, to the central server, an inference result obtained by the terminal device through inference, and the central server sends the inference result to a next terminal device, in this embodiment of this application, a quantity of times of transmitting the inference result can be reduced and communication overheads can be reduced. Because the X communication apparatuses complete the inference task of the third communication apparatus based on X submodels, a computing power requirement of the third communication apparatus can be reduced, and a risk of leaking original data of the third communication apparatus to a central server can also be reduced.

In a possible design, the inference information includes one or more of the following: a data amount size, data precision, a quantity of layers of a model, an input/output dimension of the model, floating-point operations of each layer of the model, a type of an inference task, a priority of the inference task, or a maximum split amount of the model, where the type of the inference task includes a model type and a data type, the model type is private or public, and the data type is private or public.

In a possible design, that a third communication apparatus sends inference information to a second communication apparatus includes: The third communication apparatus sends an inference request to the second communication apparatus, where the inference request includes the type of the inference task, and the inference request is used to request the second communication apparatus to perform the inference task. The third communication apparatus receives an acknowledgment of the second communication apparatus for the inference request. The third communication apparatus sends, based on the acknowledgment, the inference information to the second communication apparatus.

Based on the foregoing two possible designs, the third communication apparatus may send the inference request to the second communication apparatus, and after receiving an acknowledgment from the second communication apparatus, send the inference information to the second communication apparatus, so that the second communication apparatus schedules the X communication apparatuses to complete the inference task of the third communication apparatus.

In a possible design, before the third communication apparatus sends the data to the communication apparatus 1, the method further includes: The third communication apparatus receives submodel information corresponding to the X communication apparatuses from the second communication apparatus, where the submodel information indicates a quantity of model layers corresponding to the submodel. The third communication apparatus splits the model based on the submodel information to obtain X submodels, where a communication apparatus x corresponds to an $x^{th}$ submodel, a submodel corresponding to a first communication apparatus is used by the first communication apparatus to perform inference on received data, x is greater than or equal to 1, and x is less than or equal to X. The third communication apparatus sends the submodel corresponding to the communication apparatus x to the communication apparatus x.

In a possible design, the third communication apparatus sends the model or identification information of the model to the second communication apparatus.

Based on the foregoing two possible designs, the third communication apparatus may split the model based on the submodel information sent by the second communication apparatus, to obtain the submodels corresponding to the communication apparatuses, and send the submodels. Alternatively, the third communication apparatus may send the model to the second communication apparatus, and the second communication apparatus splits the model to obtain the submodels corresponding to the communication apparatuses, and sends the submodels.

In a possible design, that the third communication apparatus sends the submodel corresponding to the communication apparatus x to the communication apparatus x includes: The third communication apparatus encrypts the submodel corresponding to the communication apparatus x. The third communication apparatus sends the encrypted submodel to the communication apparatus x.

Based on this possible design, encrypting the submodel can improve security protection of the submodel, and reduce a leakage risk of the submodel.

In a possible design, that the third communication apparatus sends data to the communication apparatus 1 includes: The third communication apparatus encrypts the data. The third communication apparatus sends the encrypted data to the communication apparatus 1.

Based on this possible design, encrypting the data can improve data security protection, and reduce a data leakage risk.

In a possible design, that the third communication apparatus sends data to the communication apparatus 1 includes: The third communication apparatus sends the data to the communication apparatus 1 via the second communication apparatus.

Based on this possible design, the third communication apparatus may directly send the data to the communication apparatus 1, or may send the data to the communication apparatus 1 via the second communication apparatus. This is not limited.

According to an eighth aspect, an embodiment of this application provides a communication apparatus. The communication apparatus may implement functions performed by the third communication apparatus in the seventh aspect or the possible designs of the seventh aspect. The functions may be implemented by hardware executing corresponding software. The hardware or the software includes one or more modules corresponding to the functions, for example, a transceiver module and a processing module. The transceiver module is configured to send inference information to a second communication apparatus; and is further configured to receive second indication information from the second communication apparatus, where the second indication information indicates a communication apparatus 1 and a communication apparatus X in X communication apparatuses, the X communication apparatuses are determined by the second communication apparatus based on the inference information, and X is greater than or equal to 1. The transceiver module is further configured to: send data to the communication apparatus 1; and receive an inference result from the communication apparatus X.

In a possible design, the inference information includes one or more of the following: a data amount size, data precision, a quantity of layers of a model, an input/output dimension of the model, floating-point operations of each layer of the model, a type of an inference task, a priority of the inference task, or a maximum split amount of the model, where the type of the inference task includes a model type and a data type, the model type is private or public, and the data type is private or public.

In a possible design, the transceiver module sends an inference request to the second communication apparatus, where the inference request includes the type of the inference task, and the inference request is used to request the second communication apparatus to perform the inference task. The transceiver module further receives an acknowledgment of the second communication apparatus for the inference request; and sends, based on the acknowledgment, the inference information to the second communication apparatus.

In a possible design, the transceiver module is further configured to: before sending the data to the communication apparatus 1, receive submodel information corresponding to the X communication apparatuses from the second communication apparatus, where the submodel information indicates a quantity of model layers corresponding to the submodel. The processing module is configured to split the model based on the submodel information to obtain X submodels, where a communication apparatus x corresponds to an $x^{th}$ submodel, a submodel corresponding to a first communication apparatus is used by the first communication apparatus to perform inference on received data, x is greater than or equal to 1, and x is less than or equal to X. The transceiver module is further configured to send the submodel corresponding to the communication apparatus x to the communication apparatus x.

In a possible design, the processing module encrypts the submodel corresponding to the communication apparatus x. The transceiver module sends the encrypted submodel to the communication apparatus x.

In a possible design, the transceiver module is further configured to send the model or identification information of the model to the second communication apparatus.

In a possible design, the processing module encrypts the data. The transceiver module sends the encrypted data to the communication apparatus 1.

In a possible design, the transceiver module sends the data to the communication apparatus 1 via the second communication apparatus.

It should be noted that, for a specific implementation of the communication apparatus in the eighth aspect, refer to behavior functions of the third communication apparatus in the split inference method according to any one of the seventh aspect or the possible designs of the seventh aspect.

According to a ninth aspect, an embodiment of this application provides a communication apparatus. The communication apparatus may be a third communication apparatus or a chip or a system-on-a-chip in the third communication apparatus. The communication apparatus may implement functions performed by the third communication apparatus in the foregoing aspects or the possible designs. The functions may be implemented by hardware. In one possible design, the communication apparatus may include a transceiver and a processor. The transceiver and the processor may be configured to support the communication apparatus in implementing the functions in any one of the seventh aspect or the possible designs of the seventh aspect. For example, the transceiver may be configured to send inference information to a second communication apparatus; and is further configured to receive second indication information from the second communication apparatus, where the second indication information indicates a communication apparatus 1 and a communication apparatus X in X communication apparatuses, the X communication apparatuses are determined by the second communication apparatus based on the inference information, and X is greater than or equal to 1. The transceiver may be further configured to: send data to the communication apparatus 1; and receive an inference result from the communication apparatus X. In another possible design, the communication apparatus may further include a memory. The memory is configured to store computer-executable instructions and data that are necessary for the communication apparatus. When the communication apparatus is run, the transceiver and the processor execute the computer-executable instructions stored in the memory, so that the communication apparatus performs the split inference method according to any one of the seventh aspect or the possible designs of the seventh aspect.

For a specific implementation of the communication apparatus in the ninth aspect, refer to behavior functions of the third communication apparatus in the split inference method according to any one of the seventh aspect or the possible designs of the seventh aspect.

According to a tenth aspect, a communication apparatus is provided. The communication apparatus includes one or more processors. The one or more processors are configured to run a computer program or instructions. When the one or more processors execute the computer program or the instructions, the communication apparatus is enabled to perform the split inference method according to any one of the first aspect or the possible designs of the first aspect, perform the split inference method according to any one of the fourth aspect or the possible designs of the fourth aspect, or perform the split inference method according to any one of the seventh aspect or the possible designs of the seventh aspect.

In a possible design, the communication apparatus further includes one or more memories, the one or more memories are coupled to the one or more processors, and the one or more memories are configured to store the foregoing computer program or instructions. In a possible implementation, the memory is located outside the communication apparatus. In another possible implementation, the memory is located inside the communication apparatus. In this embodiment of this application, the processor and the memory may alternatively be integrated into one component. In other words, the processor and the memory may alternatively be integrated together. In a possible implementation, the communication apparatus further includes a transceiver. The transceiver is configured to: receive information and/or send information.

In a possible design, the communication apparatus further includes one or more communication interfaces, the one or more communication interfaces are coupled to the one or more processors, and the one or more communication interfaces are configured to communicate with a module other than the communication apparatus.

According to an eleventh aspect, a communication apparatus is provided. The communication apparatus includes an input/output interface and a logic circuit. The input/output interface is configured to: input and/or output information. The logic circuit is configured to: perform the split inference method according to any one of the first aspect or the possible designs of the first aspect, perform the split inference method according to any one of the fourth aspect or the possible designs of the fourth aspect, or perform the split inference method according to any one of the seventh aspect or the possible designs of the seventh aspect, and perform processing based on the information and/or generate the information.

According to a twelfth aspect, a computer-readable storage medium is provided. The computer-readable storage medium stores computer instructions or a program. When the computer instructions or the program is run on a computer, the split inference method according to any one of the first aspect or the possible designs of the first aspect is performed, the split inference method according to any one of the fourth aspect or the possible designs of the fourth aspect is performed, or the split inference method according to any one of the seventh aspect or the possible designs of the seventh aspect is performed.

According to a thirteenth aspect, a computer program product including computer instructions is provided. When the computer program product runs on a computer, the splitting inference method according to any one of the first aspect or the possible designs of the first aspect is performed, the splitting inference method according to any one of the fourth aspect or the possible designs of the fourth aspect is performed, or the splitting inference method according to any one of the seventh aspect or the possible designs of the seventh aspect is performed.

According to a fourteenth aspect, an embodiment of this application provides a computer program. When the computer program is run on a computer, the splitting inference method according to any one of the first aspect or the possible designs of the first aspect is performed, the splitting inference method according to any one of the fourth aspect or the possible designs of the fourth aspect is performed, or the splitting inference method according to any one of the seventh aspect or the possible designs of the seventh aspect is performed.

For technical effects brought by any design of the tenth aspect to the fourteenth aspect, refer to technical effects brought by any possible design of the first aspect, refer to technical effects brought by any possible design of the fourth aspect, or refer to technical effects brought by any possible design of the seventh aspect.

According to a fifteenth aspect, a communication system is provided. The communication system includes the communication apparatus according to either of the second aspect and the third aspect and the communication apparatus according to either of the fifth aspect and the sixth aspect, or includes the communication apparatus according to either of the second aspect and the third aspect, the communication apparatus according to either of the fifth aspect and the sixth aspect, and the communication apparatus according to either of the eighth aspect and the ninth aspect.

DESCRIPTION OF EMBODIMENTS

Before embodiments of this application are described, technical terms used in embodiments of this application are described.

Model: With the advent of the era of big models, deep learning models with massive parameters, such as a BERT model and a GPT model, can complete increasingly complex tasks and achieve better performance. For the large model, an inference process of the model is limited by a device capacity. Therefore, the large model is usually stored on a central server on the cloud.

A communication apparatus in a network generates massive original data every day. The communication apparatus may send the original data to the central server. The central server may invoke a corresponding model to perform inference on the original data, to obtain an inference result, and send the inference result to the communication apparatus, to complete inference on the original data.

However, because a data amount of the original data is large, during processing of the original data, a large quantity of communication resources are needed to transmit the original data, and communication overheads are high. In addition, because the communication apparatus sends the original data to the central server, there is a risk of user privacy leakage.

Based on this, a distributed inference technology of a deep neural network is provided. In the distributed inference technology, the communication apparatus may participate in an inference process by using local computing power of the communication apparatus. Specifically, the central server may split a model used to perform inference on the original data, and send a part of the model obtained through splitting to the communication apparatus. The communication apparatus performs inference on the original data based on the part of the model, to obtain an intermediate inference result, and sends the intermediate inference result to the central server. The central server performs inference on the intermediate inference result based on a remaining part of the model, to obtain an inference result, and sends the inference result to the communication apparatus. This prevents the communication apparatus from sending the original data to the central server, thereby reducing communication overheads.

Figure 1:
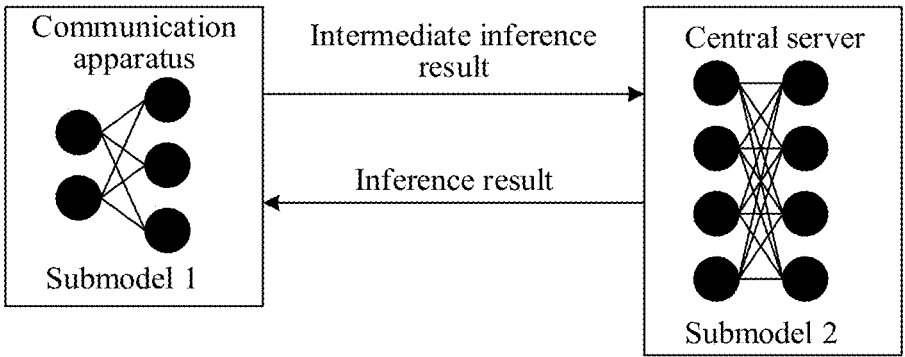
FIG. 1 is a diagram of an inference process according to an embodiment of this application.

For example, as shown in FIG. 1, the model includes n layers. The central server may split the model into a submodel 1 and a submodel 2. The submodel 1 may include a first layer to an $n1^{th}$ layer of the model, and the submodel 2 may include an $(n1+1)^{th}$ layer to an $n^{th}$ layer of the model. The central server may send the submodel 1 to the communication apparatus. The communication apparatus may perform inference on original data based on the submodel 1, obtain an intermediate inference result, and send the intermediate inference result to the central server. The central server performs inference on the received intermediate inference result based on the submodel 2, to obtain an inference result, and sends the inference result to the communication apparatus.

The foregoing solution can prevent the communication apparatus from sending the original data to the central server, thereby reducing communication overheads. However, because the communication apparatus usually does not have large storage space or high computing power, when the central server splits the model, a submodel corresponding to the communication apparatus usually occupies a small quantity of layers of the model. Consequently, participation of the communication apparatus in the inference process is limited. In addition, even if the communication apparatus does not send the original data to the central server, the central server may still deduce the original data based on the received intermediate inference result, and therefore there is still a risk of user privacy leakage.

Based on this, the central server may split the model into a plurality of submodels, and send the plurality of submodels to a plurality of communication apparatuses, where each communication apparatus corresponds to one submodel. The plurality of communication apparatuses may perform inference on the original data based on the plurality of submodels, to obtain an inference result, thereby improving participation of the communication apparatuses in the inference process.

Figure 2:
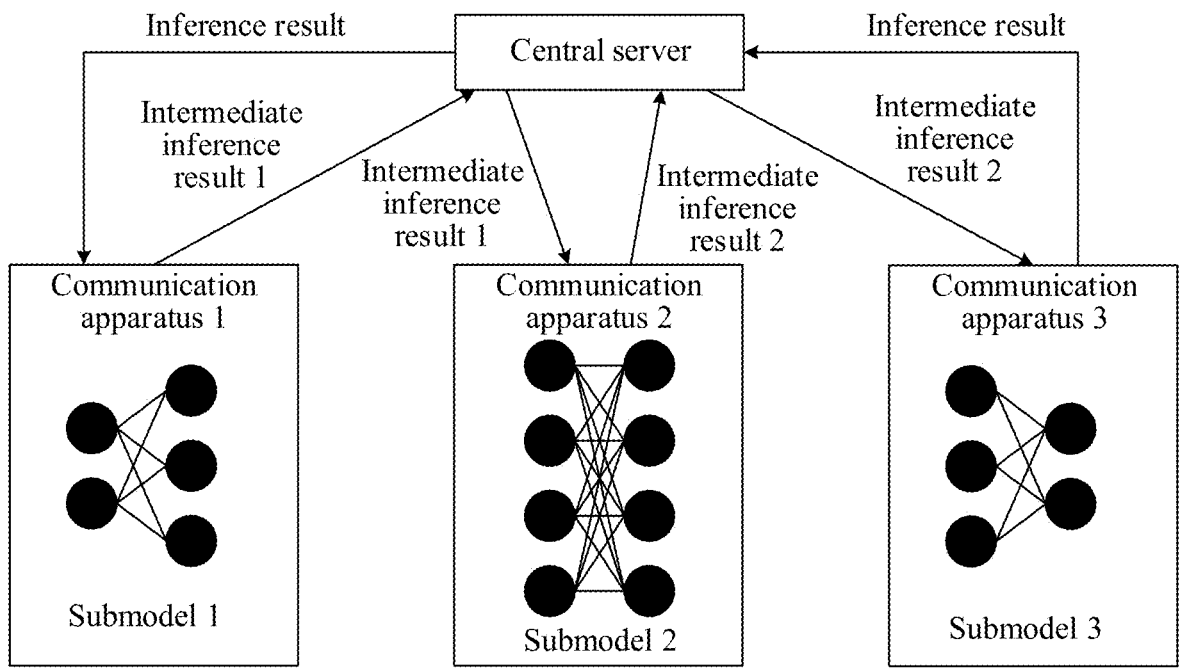
FIG. 2 is a diagram of an inference process according to an embodiment of this application.

For example, as shown in FIG. 2, the model includes n layers. The central server may split the model into a submodel 1, a submodel 2, and a submodel 3. The submodel 1 may include a first layer to an $n1^{th}$ layer of the model, the submodel 2 may include an $(n1+1)^{th}$ layer to an $n2^{th}$ layer of the model, and the submodel 3 may include an $(n2+1)^{th}$ layer to an $n^{th}$ layer of the model. The central server may send the submodel 1 to a communication apparatus 1, send the submodel 2 to a communication apparatus 2, and send the submodel 3 to a communication apparatus 3. The communication apparatus 1 may perform inference on the original data based on the submodel 1, to obtain an intermediate inference result 1, and send the intermediate inference result 1 to the central server. The central server sends the intermediate inference result 1 to the communication apparatus 2. The communication apparatus 2 performs inference on the intermediate inference result 1 based on the submodel 2, to obtain an intermediate inference result 2, and sends the intermediate inference result 2 to the central server. The central server sends the intermediate inference result 2 to the communication apparatus 3. The communication apparatus 3 performs inference on the intermediate inference result 2 based on the submodel 3, to obtain an inference result, and sends the inference result to the central server. The central server sends the inference result to the communication apparatus 1, to complete inference.

In the foregoing solution, the central server does not participate in a specific inference process, and participates in only forwarding of the intermediate inference result or the inference result. The plurality of communication apparatuses participate in the inference process, so that participation of the communication apparatuses can be improved. In addition, compared with transmitting the massive original data, transmitting the intermediate inference result can reduce communication overheads.

However, as a quantity of times of transmitting the intermediate inference result increases, communication overheads continuously increase. In addition, because the communication apparatus sends the intermediate inference result to the central server, the central server may still deduce the original data based on the received intermediate inference result, and therefore there is still a risk of user privacy leakage.

In conclusion, when the model is used to perform inference on the original data, how to reduce communication overheads and also reduce a risk of leaking the original data to the central server becomes an urgent technical problem to be resolved.

To resolve the technical problem, embodiments of this application provide a split inference method. In the method, a first communication apparatus may receive first indication information from a second communication apparatus, where the first indication information indicates a previous-hop communication apparatus and a next-hop communication apparatus of the first communication apparatus, and the previous-hop communication apparatus and the next-hop communication apparatus of the first communication apparatus each include at least one terminal device. The first communication apparatus receives data from the previous-hop communication apparatus of the first communication apparatus. The first communication apparatus performs inference on the data based on a submodel corresponding to the first communication apparatus, to obtain an inference result, where the submodel corresponding to the first communication apparatus is one of X submodels obtained by splitting a model based on X communication apparatuses, a communication apparatus x in the X communication apparatuses corresponds to an $x^{th}$ submodel, and the X communication apparatuses include the first communication apparatus, where x is greater than or equal to 1, and x is less than or equal to X. The first communication apparatus sends the inference result to the next-hop communication apparatus of the first communication apparatus.

In embodiments of this application, the previous-hop communication apparatus and the next-hop communication apparatus of the first communication apparatus each include the at least one terminal device. To be specific, the first communication apparatus may obtain data from the terminal device, or the first communication apparatus may send an inference result to the terminal device. Compared with a case in which a communication apparatus obtains data from a central server and sends an inference result to the central server, and the central server sends the inference result to a next communication apparatus, in this application, a quantity of times of transmitting the inference result can be reduced and communication overheads can be reduced. In addition, the first communication apparatus obtains the data from the terminal device, or sends the inference result to the terminal device, so that a risk of leaking the data to a central server can be reduced and a risk of user privacy leakage can be reduced.

The following describes implementations of embodiments of this application in detail with reference to the accompanying drawings in this specification.

The split inference method provided in embodiments of this application may be applied to any communication system. The communication system may be a 3rd generation partnership project (3GPP) communication system, for example, a long term evolution (LTE) communication system, may be a 5th generation (5G) mobile communication system, a new radio (NR) communication system, or a vehicle-to-everything (V2X) system, may be a system in which LTE and 5G hybrid networking is used, or a device-to-device (D2D) communication system, a machine-to-machine (M2M) communication system, the internet of things (IoT), the narrowband internet of things (NB-IoT), and a communication system evolved after 5G, or may be a non-3GPP communication system such as wireless fidelity (Wi-Fi). This is not limited.

The split inference method provided in embodiments of this application may be applied to various communication scenarios, for example, may be applied to one or more of the following communication scenarios: enhanced mobile broadband (eMBB), ultra-reliable and low latency communications (URLLC), machine type communication (MTC), massive machine type communication (mMTC), D2D, vehicle-to-everything (V2X), or IoT.

Figure 3:
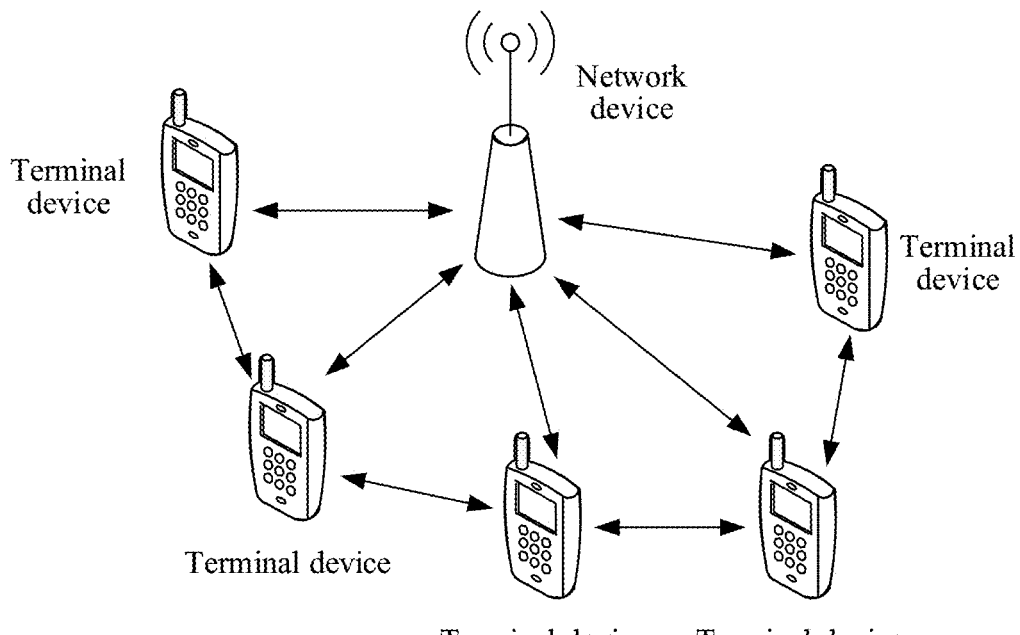
FIG. 3 is a diagram of a communication system according to an embodiment of this application.

The following uses FIG. 3 as an example to describe a communication system provided in an embodiment of this application.

FIG. 3 is a diagram of a communication system according to an embodiment of this application. As shown in FIG. 3, the communication system may include a network device and a terminal device.

The network device may include a central server, and the central server may store a model used to perform inference on data. The terminal device and the network device may train a machine learning model by exchanging information to complete a given machine learning task. The exchanged information may include information such as original data collected by the terminal device or the network device, an intermediate inference result, and an inference result. Optionally, the terminal device or the network device may include a data collection module, and the data collection module may be configured to collect original data.

As shown in FIG. 3, the terminal device may be located in a beam/cell coverage area of the network device. The terminal device may perform air interface communication with the network device through an uplink (UL) or a downlink (DL). For example, the terminal device may send uplink data to the network device in an UL direction through a physical uplink shared channel (PUSCH), and the network device may send downlink data to the terminal device in a DL direction through a physical downlink shared channel (PDSCH).

The terminal device in FIG. 3 may be a terminal device that supports a new air interface, and may access a communication system through an air interface, and initiate a service such as a call or an internet access service. The terminal device may also be referred to as user equipment (UE), a mobile station (MS), a mobile terminal (MT), or the like. Specifically, the terminal device in FIG. 3 may be a cellular phone (cellular phone), a mobile phone (mobile phone), a smartphone (smartphone), a wireless data card, a personal digital assistant (PDA) computer, a tablet computer, a wireless modem (modem), a laptop computer (laptop computer), an MTC terminal, or a computer having a wireless transceiver function. The terminal device may alternatively be a virtual reality (VR) terminal, an augmented reality (AR) terminal, a wireless terminal in industrial control, a wireless terminal in self driving, a wireless terminal in telemedicine, a wireless terminal in a smart grid, a wireless terminal in a smart city (smart city), a wireless terminal in a smart home (smart home), a vehicle-mounted terminal, a handheld device (handheld) having a wireless communication function, a wearable device, a computing device, another processing device connected to a wireless modem, a vehicle having a vehicle-to-vehicle (V2V) communication capability, an intelligent connected vehicle, an uncrewed aerial vehicle having a UAV-to-UAV (U2U) communication capability, or the like. This is not limited.

The network device in FIG. 3 may be any device having a wireless transceiver function, and is mainly configured to:

implement functions such as a wireless physical control function, resource scheduling and radio resource management, a radio access control and mobility management function, and provide a reliable wireless transmission protocol, a data encryption protocol, and the like. The network device may be a device deployed in a radio access network to provide a wireless communication function for the terminal device.

The network device in FIG. 3 may be a device supporting wired access, or may be a device supporting wireless access. For example, the network device may be an access network (AN)/radio access network (RAN) device, and includes a plurality of AN/RAN nodes. The AN/RAN node may be an access point (AP), a NodeB (NB), an enhanced NodeB (eNB), a next generation NodeB (gNB), a transmission reception point (TRP), a transmission point (TP), another access node, or the like. The base station may include a macro base station, a micro base station, a relay station, and the like in various forms, may be a device that bears a base station function in device-to-device (D2D), vehicle-to-everything (V2X), or machine-to-machine (M2M) communication or the like, or may include a central unit (CU) and a distributed unit (DU) in a cloud radio access network (C-RAN) system, and a network device in a non-terrestrial network (NTN) communication system, that is, may be deployed on a high-altitude platform or a satellite. This is not specifically limited in embodiments of this application.

Figure 4:
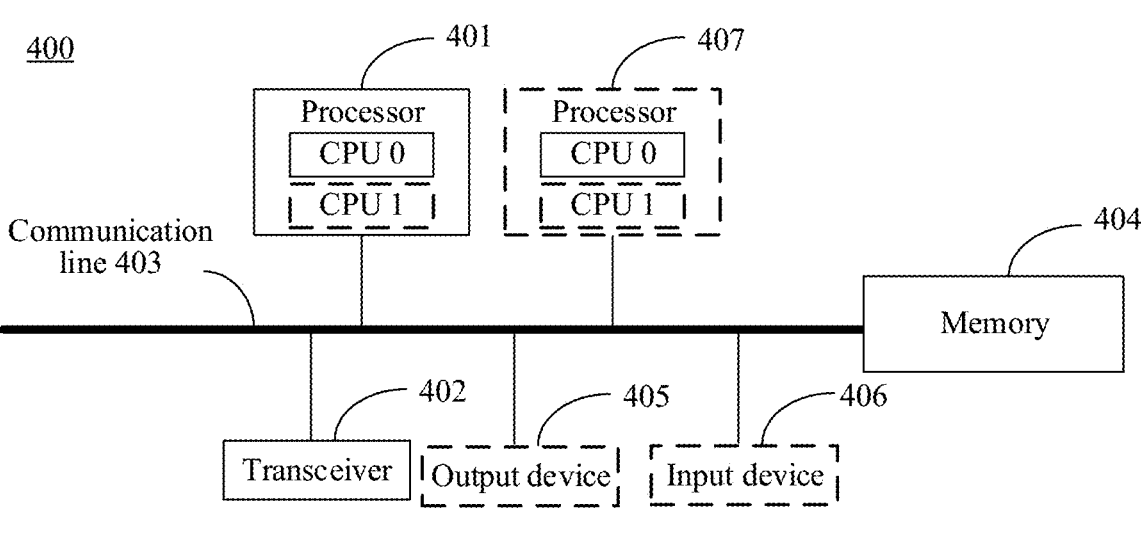
FIG. 4 is a schematic composition diagram of a communication apparatus according to an embodiment of this application.

In a specific implementation, as shown in FIG. 3, for example, each terminal device or each network device may use a composition structure shown in FIG. 4, or include components shown in FIG. 4. FIG. 4 is a schematic composition diagram of a communication apparatus 400 according to an embodiment of this application. The communication apparatus 400 may be a terminal device or a chip or a system-on-a-chip in the terminal device, or may be a network device or a chip or a system-on-a-chip in the network device. As shown in FIG. 4, the communication apparatus 400 includes a processor 401, a transceiver 402, and a communication line 403.

The communication apparatus 400 may further include a memory 404. The processor 401, the memory 404, and the transceiver 402 may be connected through the communication line 403.

The processor 401 is a central processing unit (CPU), a general-purpose processor, a network processor (NP), a digital signal processor (DSP), a microprocessor, a microcontroller, a programmable logic device (PLD), or any combination thereof. The processor 401 may alternatively be another apparatus having a processing function, for example, a circuit, a component, or a software module. This is not limited.

The transceiver 402 is configured to communicate with another device or another communication network. The another communication network may be the Ethernet, a RAN, a wireless local area network (WLAN), or the like. The transceiver 402 may be a module, a circuit, a transceiver, or any apparatus that can implement communication.

The communication line 403 is configured to transmit information between the components included in the communication apparatus 400.

The memory 404 is configured to store instructions. The instructions may be a computer program.

The memory 404 may be a read-only memory (ROM) or another type of static storage device that can store static information and/or instructions, may be a random access memory (RAM) or another type of dynamic storage device that can store information and/or instructions, or may be an electrically erasable programmable read-only memory (EE-PROM), a compact disc read-only memory (CD-ROM) or another compact disc storage, an optical disc storage (including a compressed optical disc, a laser disc, an optical disc, a digital versatile disc, a Blu-ray optical disc, or the like), a magnetic disk storage medium or another magnetic storage device, or the like. This is not limited.

It should be noted that the memory 404 may be independent of the processor 401, or may be integrated into the processor 401. The memory 404 may be configured to store instructions, program code, some data, or the like. The memory 404 may be located inside the communication apparatus 400, or may be located outside the communication apparatus 400. This is not limited. The processor 401 is configured to execute instructions stored in the memory 404 to perform a split inference method provided in the following embodiments of this application.

In an example, the processor 401 may include one or more CPUs, for example, a CPU 0 and a CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. For example, the input device 406 is a device, for example, a touchscreen, a keyboard, a mouse, a microphone, or a joystick, and the output device 405 is a device, for example, a display or a speaker (speaker).

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or combine some components, or have different component arrangements.

In this embodiment of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Other names may alternatively be used in a specific implementation. This is not limited.

Figure 5:
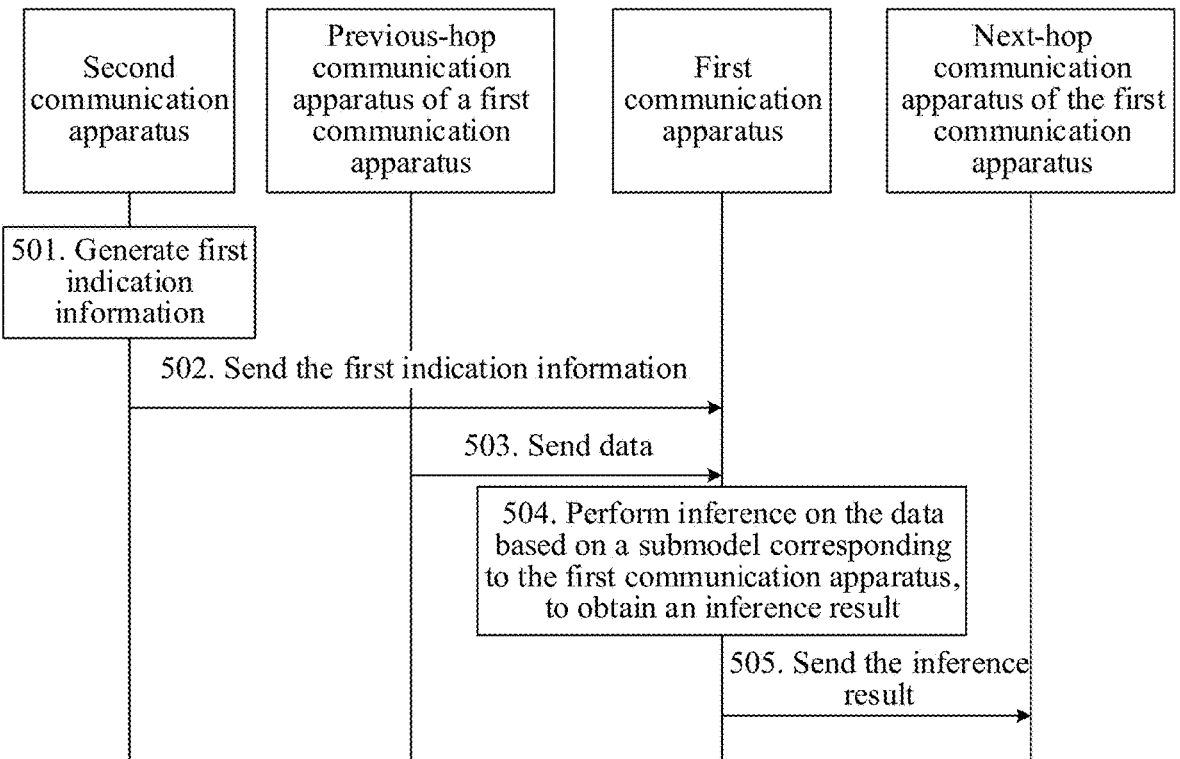
FIG. 5 is a schematic interaction diagram of a split inference method according to an embodiment of this application.

With reference to FIG. 5, the following describes, based on the communication system shown in FIG. 3 by using an example in which a network device has an inference task and the network device may schedule a plurality of terminal devices to complete the inference task together, the split inference method provided in embodiments of this application. A first communication apparatus may be any terminal device scheduled by the network device that has the inference task in the communication system shown in FIG. 3, and a second communication apparatus may be the network device that has the inference task in the communication system shown in FIG. 3. A first communication apparatus and a second communication apparatus in the following embodiments each may include the components shown in FIG. 4. Processing performed by a single execution body (the terminal device or the network device) shown in embodiments of this application may also be divided into processing processed by a plurality of execution bodies, and these execution bodies may be logically and/or physically separated. For example, processing performed by the network device may be divided into processing performed by at least one of a central unit (CU), a distribution unit (DU), and a radio unit (RU). This is not limited.

FIG. 5 is a schematic interaction diagram of a split inference method according to an embodiment of this application. As shown in FIG. 5, the method may include the following steps.

Step 501. A second communication apparatus generates first indication information.

Step 502: The second communication apparatus sends the first indication information to a first communication apparatus, and correspondingly, the first communication apparatus receives the first indication information from the second communication apparatus.

When the second communication apparatus has an inference task, it indicates that a model needs to be used to perform inference on data of the second communication apparatus, to obtain an inference result, where the model may be provided by the second communication apparatus. Optionally, the model may be stored in the second communication apparatus. In this case, the second communication apparatus may schedule X communication apparatuses to jointly complete the inference task by using the model, where X is greater than or equal to 1, the X communication apparatuses may be X terminal devices, and any one of the X communication apparatuses may be described as the first communication apparatus in this embodiment of this application.

Specifically, the second communication apparatus may select and sort the X communication apparatuses. The second communication apparatus may further split the model into X submodels based on the X communication apparatuses, and respectively send the X submodels to the X communication apparatuses. That is, a communication apparatus x in the sorted X communication apparatuses may correspond to an $x^{th}$ submodel (or may be described as a submodel x) in the X submodels, where x is greater than or equal to 1, x is less than or equal to X, a last layer of an $(x-1)^{th}$ submodel and a first layer of the $x^{th}$ submodel are adjacent layers in the model, and a last layer of the $x^{th}$ submodel and a first layer of an $(x+1)^{th}$ submodel are adjacent layers in the model. The X communication apparatuses may jointly complete the inference task of the second communication apparatus based on the received submodel.

Optionally, the second communication apparatus includes a model server and a control server. The model server has large storage space, and may be used to store the model. The control server has high computing power, and may be used to select a communication apparatus and split the model.

The second communication apparatus may further determine a previous-hop communication apparatus and a next-hop communication apparatus of each of the X communication apparatuses based on a sorting result, and send first indication information to each of the X communication apparatuses, to indicate the previous-hop communication apparatus and the next-hop communication apparatus of each communication apparatus. The previous-hop communication apparatus and the next-hop communication apparatus of each communication apparatus each include at least one terminal device.

For example, the first indication information may include identification information of the previous-hop communication apparatus and identification information of the next-hop communication apparatus.

For example, the identification information may be an identity (ID), an internet protocol (IP) address, a media access control (MAC) address, an international mobile subscriber identity (IMSI), a globally unique temporary identity (GUTI), a subscription permanent identifier (SUPI), or a generic public subscription identifier (GPSI) of the communication apparatus. This is not limited.

It should be noted that, because the first communication apparatus may be any one of the X communication apparatuses, that the second communication apparatus sends the first indication information to each communication apparatus may also be described as that the second communication apparatus sends the first indication information to the first communication apparatus. The first indication information may indicate a previous-hop communication apparatus and a next-hop communication apparatus of the first communication apparatus.

In a first possible design, the second communication apparatus may split the model based on dynamic planning when determining the X communication apparatuses, determine a sorting result of the X communication apparatuses and a submodel corresponding to each communication apparatus, determine a previous-hop communication apparatus and a next-hop communication apparatus of each of the X communication apparatuses based on the sorting result, and send, to each of the X communication apparatuses, the submodel corresponding to the communication apparatus and the first indication information.

Figure 7:
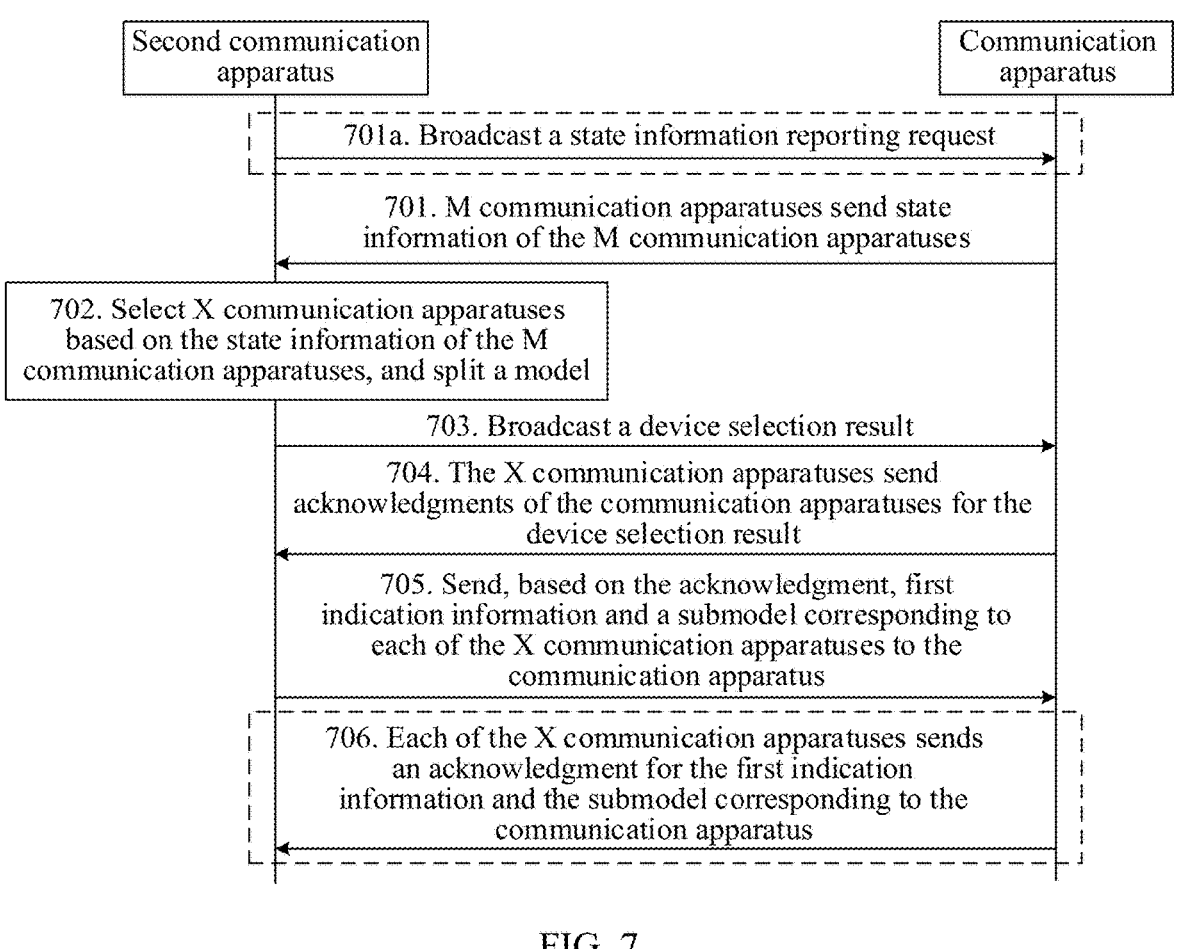
FIG. 7 is a schematic interaction diagram of a method for determining X communication apparatuses and splitting a model according to an embodiment of this application.
Figure 8:
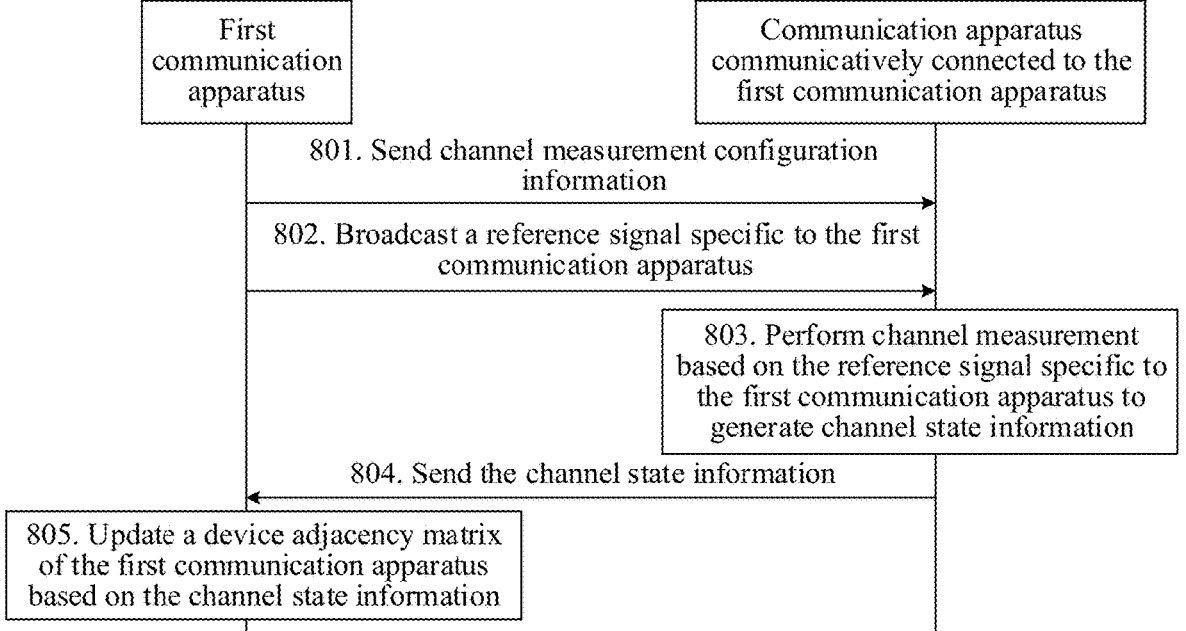
FIG. 8 is a schematic interaction diagram of a method for updating a device adjacency matrix according to an embodiment of this application.

For specific descriptions of the first possible design, refer to related descriptions in FIG. 7 and FIG. 8. Details are not described herein.

In a second possible design, the second communication apparatus may alternatively first determine the X communication apparatuses, then complete model splitting based on the X communication apparatuses and determine the sorting result of the X communication apparatuses, determine a previous-hop communication apparatus and a next-hop communication apparatus of each of the X communication apparatuses based on the sorting result, and send, to each of the X communication apparatuses, the submodel corresponding to the communication apparatus and the first indication information.

Figure 9:
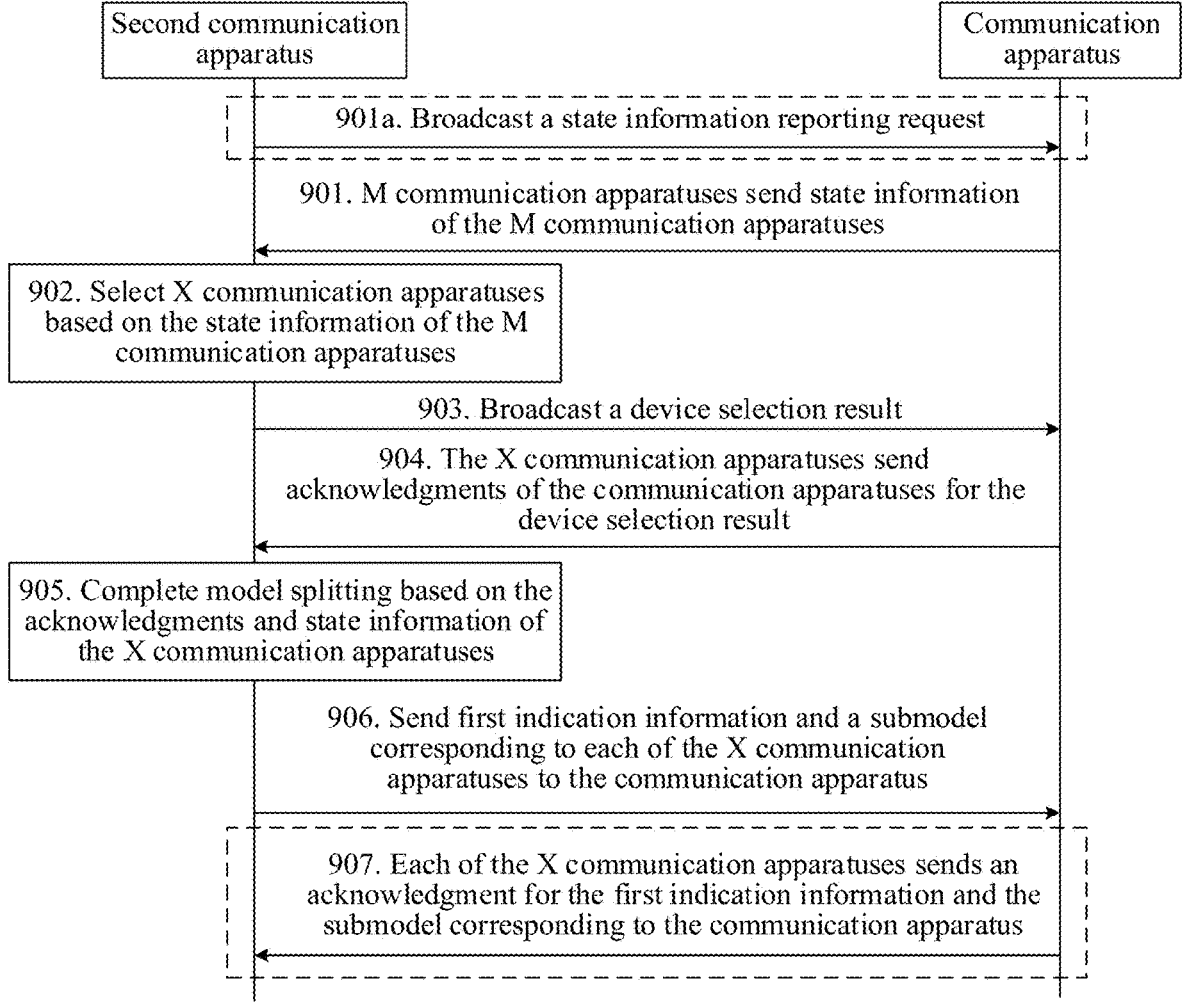
FIG. 9 is a schematic interaction diagram of a method for determining X communication apparatuses and splitting a model according to an embodiment of this application.

For specific descriptions of the second possible design, refer to related descriptions in FIG. 9. Details are not described herein again.

Based on the first possible design or the second possible design, after the second communication apparatus determines and sorts the X communication apparatuses, it may be determined that:

When the first communication apparatus is a communication apparatus 1 in the X communication apparatuses, the previous-hop communication apparatus of the first communication apparatus is the second communication apparatus, and the next-hop communication apparatus of the first communication apparatus is a communication apparatus 2 in the X communication apparatuses.

When the first communication apparatus is a communication apparatus k in the X communication apparatuses, the previous-hop communication apparatus of the first communication apparatus is a communication apparatus k−1 in the X communication apparatuses, and the next-hop communication apparatus of the first communication apparatus is a communication apparatus k+1 in the X communication apparatuses, where k is greater than or equal to 2, and k is less than or equal to X−1.

When the first communication apparatus is a communication apparatus X in the X communication apparatuses, the previous-hop communication apparatus of the first communication apparatus is a communication apparatus X−1 in the X communication apparatuses, and the next-hop communication apparatus of the first communication apparatus is the second communication apparatus.

Step 503: The first communication apparatus receives data from the previous-hop communication apparatus of the first communication apparatus.

Step 504: The first communication apparatus performs inference on the data based on the submodel corresponding to the first communication apparatus, to obtain an inference result.

Step 505: The first communication apparatus sends the inference result to the next-hop communication apparatus of the first communication apparatus.

Figure 6:
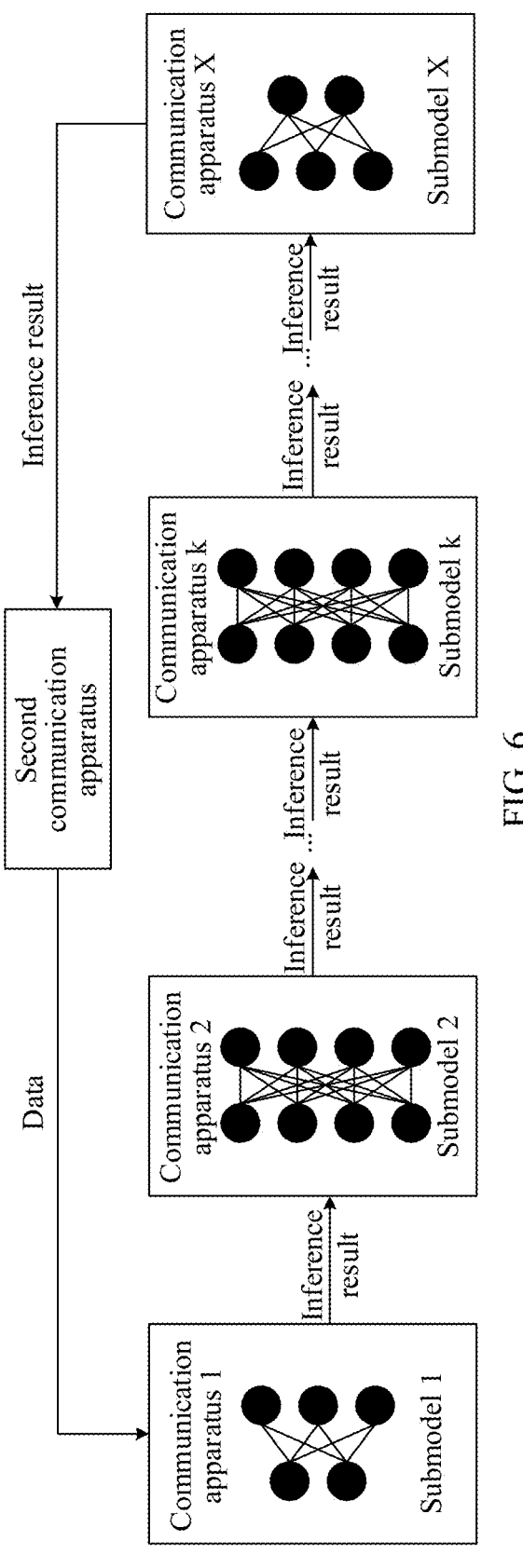
FIG. 6 is a diagram of a split inference method according to an embodiment of this application.

As shown in FIG. 6, when the first communication apparatus is a communication apparatus 1 in the X communication apparatuses, the communication apparatus 1 may receive data sent by the second communication apparatus. The communication apparatus 1 may perform, based on a submodel (for example, a submodel 1) corresponding to the communication apparatus 1, inference on the data sent by the second communication apparatus, to obtain an inference result, and send the inference result to a communication apparatus 2 in the X communication apparatuses.

It should be noted that the data sent by the second communication apparatus to the communication apparatus 1 is data on which inference needs to be performed in the second communication apparatus. The inference result obtained by the communication apparatus 1 by performing inference on the data is essentially data. Therefore, the inference result sent by the communication apparatus 1 to the communication apparatus 2 may also be referred to as data sent by the communication apparatus 1 to the communication apparatus 2.

As shown in FIG. 6, when the first communication apparatus is a communication apparatus k in the X communication apparatuses, the communication apparatus k may receive data sent by a communication apparatus k−1 in the X communication apparatuses, perform, based on a submodel (for example, a submodel k) corresponding to the communication apparatus k, inference on the data sent by the communication apparatus k−1, to obtain an inference result, and send the inference result to a communication apparatus k+1 in the X communication apparatuses.

It should be noted that, the data sent by the communication apparatus k−1 to the communication apparatus k is an inference result obtained by the communication apparatus k−1 by performing inference based on a submodel (for example, a submodel k−1) corresponding to the communication apparatus k−1. The inference result obtained by the communication apparatus k by performing inference on the received data is essentially data. Therefore, the inference result sent by the communication apparatus k to the communication apparatus k+1 may also be referred to as data sent by the communication apparatus k to the communication apparatus k+1.

As shown in FIG. 6, when the first communication apparatus is a communication apparatus X in the X communication apparatuses, the communication apparatus X may receive data sent by a communication apparatus X−1 in the X communication apparatuses, perform, based on a submodel (for example, a submodel X) corresponding to the communication apparatus X, inference on the data sent by the communication apparatus X−1, to obtain an inference result, and send the inference result to the second communication apparatus.

It should be noted that the data sent by the communication apparatus X–1 to the communication apparatus X is an inference result obtained by the communication apparatus X–1 by performing inference based on a submodel (for example, a submodel X–1) corresponding to the communication apparatus X–1. Because the communication apparatus X is a last communication apparatus in the X communication apparatuses in this case, the communication apparatus X performs inference on the received data, and an obtained inference result is a final inference result. The communication apparatus X sends the final inference result to the second communication apparatus, to complete inference.

In conclusion, inference results obtained by first X–1 communication apparatuses in the X communication apparatuses through inference based on the submodels may be considered as intermediate inference results generated in the entire inference task process, and an inference result obtained by the last communication apparatus (that is, the communication apparatus X) through inference based on the submodel may be considered as the final inference result in the entire inference task process.

According to the method shown in FIG. 5, when the second communication apparatus schedules the X communication apparatuses to perform the inference task of the second communication apparatus, because all the X communication apparatuses are terminal devices, that is, a next-hop communication apparatus of the communication apparatus 1 is a terminal device, both a previous-hop communication apparatus and a next-hop communication apparatus of the communication apparatus k are terminal devices, and a previous-hop communication apparatus of the communication apparatus X is a terminal device, the terminal device may directly obtain data from a previous-hop terminal device, and send, to a next-hop terminal device, an inference result obtained by the terminal device through inference. Compared with a case in which a terminal device obtains data from a central server and sends, to the central server, an inference result obtained by the terminal device through inference, and the central server sends the inference result to a next terminal device, in this embodiment of this application, a quantity of times of transmitting the inference result can be reduced and communication overheads can be reduced. In addition, because the X communication apparatuses complete the inference task of the second communication apparatus based on the X submodels, a computing power requirement of the second communication apparatus can be reduced.

In the method shown in FIG. 5, in the first possible design in step 502, the second communication apparatus may use a method shown in FIG. 7 to complete model splitting based on the state information of the communication apparatus when determining the sorting result of the X communication apparatuses.

FIG. 7 shows a method for determining X communication apparatuses and splitting a model according to an embodiment of this application. As shown in FIG. 7, the method may include the following steps.

Step 701: A second communication apparatus obtains state information of M communication apparatuses, and correspondingly, the M communication apparatuses send the state information of the M communication apparatuses to the second communication apparatus.

X is greater than or equal to 1, X is less than or equal to M, the state information of the communication apparatus may indicate whether the communication apparatus supports inference, and the M communication apparatuses may be M terminal devices. In this embodiment of this application, all communication apparatuses except that the second communication apparatus may be a network device may be terminal devices.

For example, the state information of the communication apparatus may include one or more of the following: a size of storage space of the communication apparatus, maximum computing power of the communication apparatus, information about a resource occupied by the communication apparatus, a device adjacency matrix of the communication apparatus, a device state of the communication apparatus, whether the communication apparatus agrees to participate in inference, or a validity period of the state information of the communication apparatus.

The information about the resource occupied by the communication apparatus may include information such as a frequency band and a bandwidth occupied by the communication apparatus.

The device state of the communication apparatus may be idle or busy. When the device state of the communication apparatus is idle, the communication apparatus may support inference. When the device state of the communication apparatus is busy, the communication apparatus cannot support inference.

The validity period of the state information of the communication apparatus indicates that the state information of the communication apparatus is available within the validity period.

The device adjacency matrix of the communication apparatus may indicate a connection relationship between the communication apparatus and another communication apparatus, and the device adjacency matrix may further indicate a channel status or communication quality between the communication apparatus and the another communication apparatus.

Because the communication apparatus may move, the connection relationship (or the channel status or the communication quality) between the communication apparatus and the another communication apparatus also keeps changing. The communication apparatus may update the device adjacency matrix through a communication connection established between the communication apparatus and the another communication apparatus.

Optionally, the communication apparatus periodically updates the device adjacency matrix, or the communication apparatus triggers update of the device adjacency matrix based on signaling sent by the second communication apparatus.

For example, the communication apparatus may trigger update of the device adjacency matrix based on a state information reporting request sent by the second communication apparatus. The state information reporting request may be used to request the communication apparatus to report the state information of the communication apparatus. After receiving the state information reporting request sent by the second communication apparatus, the communication apparatus may update the device adjacency matrix, include an updated device adjacency matrix to the state information, and send the state information to the second communication apparatus.

For example, the device adjacency matrix of the first communication apparatus is updated. Refer to FIG. 8. An update process of the device adjacency matrix is described.

FIG. 8 shows a method for updating a device adjacency matrix according to an embodiment of this application. As shown in FIG. 8, the method may include the following steps.

Step 801: A first communication apparatus sends channel measurement configuration information to a communication apparatus communicatively connected to the first communication apparatus, and correspondingly, the communication apparatus communicatively connected to the first communication apparatus receives the channel measurement configuration information from the first communication apparatus.

The channel measurement configuration information may include one or more of the following: a frequency band occupied by the first communication apparatus, reference signal configuration information, a channel state feedback manner, or a time-frequency resource occupied for channel state feedback.

The channel state feedback manner may include one or more of the following: wideband channel state information (CSI) feedback, sub-band CSI feedback, or feature feedback extracted by a neural network.

For example, the communication apparatus may extract features of the channel state information via the neural network, and send the extracted features to the first communication apparatus.

Step 802: The first communication apparatus broadcasts a reference signal specific to the first communication apparatus, and correspondingly, the communication apparatus communicatively connected to the first communication apparatus receives the reference signal specific to the first communication apparatus.

The reference signal specific to the first communication apparatus may be a user-specific (UE-specific) reference signal of the first communication apparatus.

Step 803: The communication apparatus communicatively connected to the first communication apparatus performs channel measurement based on the reference signal specific to the first communication apparatus, to generate channel state information.

The communication apparatus communicatively connected to the first communication apparatus may perform channel measurement based on the channel measurement configuration information sent by the first communication apparatus and the reference signal specific to the first communication apparatus, to generate the channel state information.

Step 804: The communication apparatus communicatively connected to the first communication apparatus sends the channel state information to the first communication apparatus, and correspondingly, the first communication apparatus receives the channel state information from the communication apparatus communicatively connected to the first communication apparatus.

The communication apparatus communicatively connected to the first communication apparatus may send the channel state information to the first communication apparatus based on the channel measurement configuration information sent by the first communication apparatus.

Step 805: The first communication apparatus updates a device adjacency matrix of the first communication apparatus based on the channel state information.

According to the method shown in FIG. 8, each communication apparatus may update the device adjacency matrix according to the method shown in FIG. 8, and include an updated device adjacency matrix to the state information when sending the state information to the second communication apparatus, so that the second communication apparatus selects, based on the received state information, a more appropriate communication apparatus to participate in an inference task, thereby improving inference efficiency.

Optionally, before each communication apparatus sends the state information to the second communication apparatus (that is, before step 701), as shown in FIG. 7, the second communication apparatus may further perform step 701*a*.

Step 701*a*: The second communication apparatus broadcasts a state information reporting request.

The state information reporting request may be used to request the communication apparatus to report the state information of the communication apparatus.

Specifically, when the second communication apparatus has an inference task, and needs to schedule a plurality of communication apparatuses to jointly complete the inference task, the second communication apparatus may send a state information reporting request through broadcasting, and a communication apparatus that receives the state information reporting request may report state information of the communication apparatus to the second communication apparatus, that is, perform step 701.

When the state information of the communication apparatus that is received by the second communication apparatus includes a validity period of the state information of the communication apparatus, if an amount of state information that is of the communication apparatus and whose validity period expires is greater than or equal to a first threshold, the second communication apparatus may rebroadcast the state information reporting request, to re-obtain the state information of each communication apparatus, and select, based on the re-obtained state information of the communication apparatus, a more appropriate communication apparatus to participate in the inference task, thereby improving inference efficiency.

The first threshold may be pre-specified in a protocol, or may be customized by the second communication apparatus. This is not limited.

Step 702: The second communication apparatus selects X communication apparatuses based on the state information of the M communication apparatuses, and splits a model.

The second communication apparatus may complete model splitting based on dynamic planning when selecting the X communication apparatuses.

For example, the second communication apparatus may select the X communication apparatuses by using the following state transition equation, and complete model splitting:

$$f[i][j] = \min_{1 \le x \le n, x \ne i}\left(g[x][j] + \frac{output_j}{l_{xi}}\right) \qquad \text{Formula (1)}$$

$$g[i][j] = \min_{0 \le x < j}(f[i][x] + t_{i,x+1,j}) \qquad \text{Formula (2)}$$

f[i][j] represents minimum time required for first i−1 communication apparatuses to perform inference at first j layers of a model before a communication apparatus i when a current communication apparatus is selected as the communication apparatus i on a path, the first j layers of the model are allocated to the first i−1 communication apparatuses, and the communication apparatus i has no submodel, where i is greater than or equal to 1, and i is less than or equal to X.

$$\frac{output_j}{l_{xi}}$$

represents time required by a communication apparatus x to send an inference result at a $j^{th}$ layer to the communication apparatus i.

$g[i][j]$ represents minimum time required for first i communication apparatuses to perform inference at first j layers of the model when the current communication apparatus is selected as the communication apparatus i on the path, the first j layers of the model are allocated to the first i communication apparatuses, and a last layer of a submodel corresponding to the communication apparatus i is the $j^{th}$ layer. $t_{i,x+1,j}$ represents time required by the communication apparatus i to perform inference from an (x+1)th layer to the $j^{th}$ layer.

The second communication apparatus selects, according to Formula (1) and Formula (2) each time when selecting a communication apparatus, a communication apparatus with minimum time required for inference, to obtain an optimal solution as much as possible within controllable time, so that the second communication apparatus can determine the X communication apparatuses from the M communication apparatuses, and also determine a submodel corresponding to each communication apparatus, to complete sorting of the X communication apparatuses and splitting of the model.

After determining the submodel corresponding to each of the X communication apparatuses, and a previous-hop communication apparatus and a next-hop communication apparatus of each communication apparatus, the second communication apparatus may directly send submodels corresponding to the X communication apparatus and first indication information to the communication apparatuses, or may first send a device selection result in a manner of step 703 to step 705, and after receiving an acknowledgment of the communication apparatus for the device selection result, send the submodel corresponding to the communication apparatus and first indication information to the communication apparatus.

Step 703: The second communication apparatus broadcasts the device selection result, and correspondingly, the X communication apparatuses receive the device selection result from the second communication apparatus.

The device selection result may indicate the X communication apparatuses.

Step 704: The X communication apparatuses send acknowledgments of the communication apparatuses for the device selection result to the second communication apparatus, and correspondingly, the second communication apparatus receives the acknowledgments of all of the X communication apparatuses for the device selection result.

After receiving the device selection result, each of the X communication apparatuses may determine whether the communication apparatus participates in an inference task. If the communication apparatus participates in the inference task, the communication apparatus sends an acknowledgment for the device selection result to the second communication apparatus. If the communication apparatus does not participate in the inference task, the communication apparatus may send a rejection for the device selection result to the second communication apparatus.

For example, each of the X communication apparatuses may send acknowledgment (ACK) signaling to the second communication apparatus to indicate an acknowledgment for the device selection result, and send negative acknowledgment (NACK) signaling to the second communication apparatus to indicate a rejection for the device selection result.

When the second communication apparatus receives a rejection of at least one of the X communication apparatuses for the device selection result, the second communication apparatus may reselect the X communication apparatuses and rebroadcast the device selection result. When the second communication apparatus receives acknowledgments of the reselected X communication apparatuses for the device selection result, the second communication apparatus may perform step 705.

Step 705: The second communication apparatus sends, based on the acknowledgment, the first indication information and the submodel corresponding to each of the X communication apparatuses to the communication apparatus.

When the second communication apparatus sends the submodel corresponding to the communication apparatus and the first indication information to the communication apparatus, the second communication apparatus may send, in one communication, the submodel corresponding to the communication apparatus and the first indication information to the communication apparatus, or may separately send the submodel corresponding to the communication apparatus and the first indication information to the communication apparatus. This is not limited.

Optionally, the second communication apparatus further sends first information to each of the X communication apparatuses.

The first information may include one or more of the following: information about a resource occupied by the previous-hop communication apparatus of the communication apparatus, information about a resource occupied by the next-hop communication apparatus of the communication apparatus, or time information.

Optionally, the first information further includes a sorting result of the X communication apparatuses and a maximum quantity of retransmission times.

The information about the occupied resource may include resource information such as an occupied frequency band and bandwidth.

The time information may indicate a corresponding time range in which the communication apparatus receives data from a previous-hop communication apparatus of the communication apparatus.

For example, the time information may be relative time information, and the relative time information may indicate a relative inference start time range in which the communication apparatus receives data from a previous-hop communication apparatus of the communication apparatus.

For example, the relative time information may include one or more of the following: minimum relative time and maximum relative time.

The minimum relative time may be minimum time required from start of inference before a current communication apparatus, or the maximum relative time may be maximum time required from start of inference to a current communication apparatus.

Each of the X communication apparatuses may determine, based on the time information, a time range in which the data sent by the previous-hop communication apparatus is received, and performs channel detection within the time range, to determine, based on a channel detection result, the data sent by the previous-hop communication apparatus, thereby reducing power consumption caused by performing the channel detection by the communication apparatus.

Optionally, after the second communication apparatus sends the first indication information and the submodel corresponding to each of the X communication apparatuses to the communication apparatus, each of the X communication apparatuses may further perform step 706.

Step 706: Each of the X communication apparatuses sends an acknowledgment for the first indication information and the submodel corresponding to the communication apparatus to the second communication apparatus, and correspondingly, the second communication apparatus receives the acknowledgment for the first indication information and the submodel corresponding to the communication apparatus from each of the X communication apparatuses.

After receiving the first indication information and the submodel corresponding to each of the X communication apparatuses, the communication apparatus may send the acknowledgment for the first indication information and the submodel corresponding to the communication apparatus to the second communication apparatus, or may send an acknowledgment for the first indication information to the second communication apparatus after receiving the first indication information, and after receiving the submodel corresponding to the communication apparatus, send an acknowledgment for the submodel corresponding to the communication apparatus to the second communication apparatus.

Optionally, when the second communication apparatus sends the first information to each of the X communication apparatuses, the communication apparatus that receives the first information may also send an acknowledgment for the first information to the second communication apparatus.

Different from the descriptions of the first possible design in step 502 in FIG. 7 and FIG. 8, in the descriptions of the second possible design in step 502, the second communication apparatus may also use a method shown in FIG. 9 to determine X communication apparatuses based on state information of the communication apparatuses, and then determine a sorting result of the X communication apparatuses based on the X communication apparatuses and complete model splitting.

FIG. 9 shows a method for determining X communication apparatuses and splitting a model according to an embodiment of this application. As shown in FIG. 9, the method may include the following steps.

Step 901: A second communication apparatus obtains state information of M communication apparatuses, and correspondingly, the M communication apparatuses send the state information of the M communication apparatuses to the second communication apparatus.

For descriptions of step 901 and descriptions of the state information of the communication apparatus, refer to the related descriptions of step 701 and the related descriptions of the state information of the communication apparatus. Details are not described again.

Optionally, before each communication apparatus sends the state information to the second communication apparatus (that is, before step 901), as shown in FIG. 9, the second communication apparatus may further perform step 901*a*.

Step 901*a*: The second communication apparatus broadcasts a state information reporting request.

For descriptions of step 901*a*, refer to the related descriptions of step 701*a*. Details are not described again.

Step 902: The second communication apparatus selects X communication apparatuses based on the state information of the M communication apparatuses.

The second communication apparatus may randomly select the X communication apparatuses from the M communication apparatuses by using a random algorithm.

For example, the second communication apparatus may perform priority classification on the communication apparatus based on the state information of the communication apparatus. A higher priority of the communication apparatus indicates a higher probability that the communication apparatus is selected.

Step 903: The second communication apparatus broadcasts a device selection result, and correspondingly, the X communication apparatuses receive the device selection result from the second communication apparatus.

The device selection result may indicate the X communication apparatuses selected by the second communication apparatus.

Step 904: All of the X communication apparatuses send acknowledgments of the communication apparatuses for the device selection result to the second communication apparatus, and correspondingly, the second communication apparatus receives the acknowledgments of the X communication apparatuses for the device selection result.

For descriptions of step 904, refer to the related descriptions of step 704. Details are not described again.

Step 905: The second communication apparatus completes model splitting based on the acknowledgments and state information of the X communication apparatuses.

The second communication apparatus may split a model based on the state information of the X communication apparatuses, to obtain a submodel corresponding to each communication apparatus, and determine a previous-hop communication apparatus and a next-hop communication apparatus of each communication apparatus.

Step 906: The second communication apparatus sends first indication information and the submodel corresponding to each of the X communication apparatuses to the communication apparatus.

For descriptions of step 906, refer to the related descriptions of step 705. Details are not described again.

Optionally, the second communication apparatus further sends first information to each of the X communication apparatuses.

For descriptions of the first information, refer to the related descriptions of the first information in step 705. Details are not described again.

Optionally, after the second communication apparatus sends the first indication information and the submodel corresponding to each of the X communication apparatuses to the communication apparatus, each of the X communication apparatuses may further perform step 907.

Step 907: Each of the X communication apparatuses sends an acknowledgment for the first indication information and the submodel corresponding to the communication apparatus to the second communication apparatus, and correspondingly, the second communication apparatus receives the acknowledgment for the first indication information and the submodel corresponding to the communication apparatus from each of the X communication apparatuses.

For descriptions of step 907, refer to the related descriptions of step 706. Details are not described again.

Based on the foregoing descriptions of the first possible design in step 502 in FIG. 7 and FIG. 8 and the foregoing descriptions of the second possible design in step 502 in FIG. 9, when sending the submodels corresponding to the X communication apparatuses to the communication apparatuses, the second communication apparatus may encrypt the submodels, to improve transmission security of the submodels.

For example, the submodel is encrypted in a form of a key pair. The second communication apparatus may encrypt the submodel by using a method shown in FIG. 10.

Figure 10:
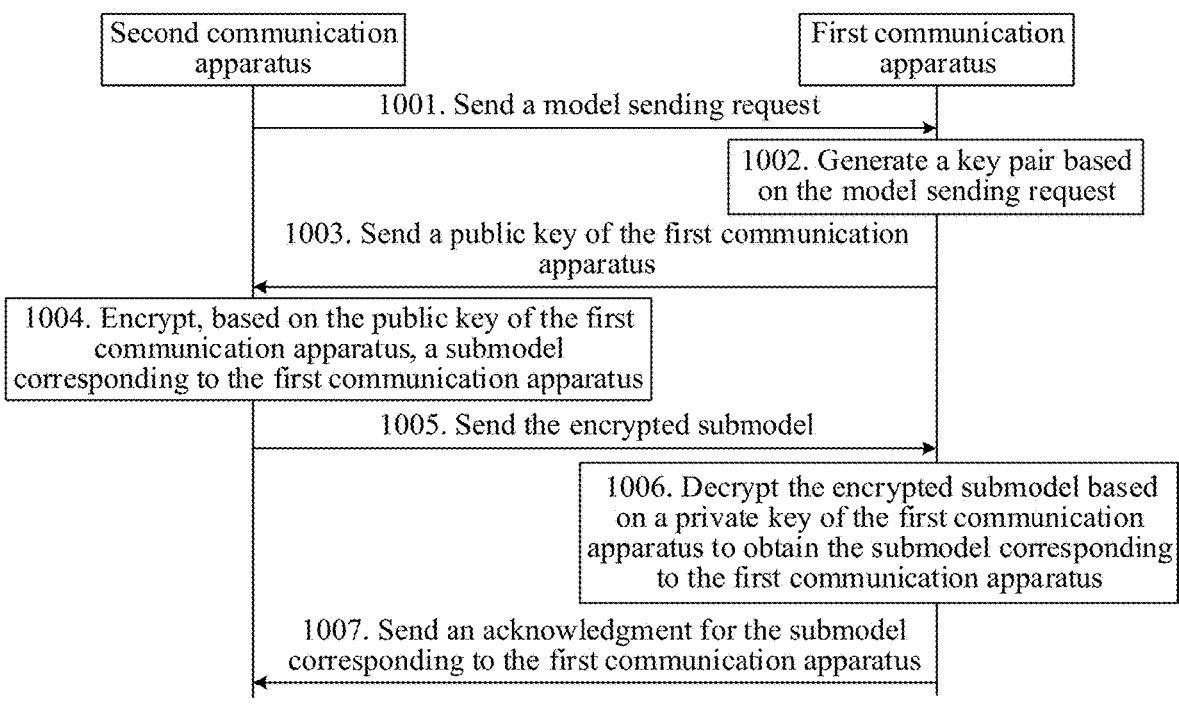
FIG. 10 is a schematic interaction diagram of a submodel encryption method according to an embodiment of this application.

In FIG. 10, an example in which a second communication apparatus sends an encrypted submodel to a first communication apparatus is used to describe a submodel encryption method according to an embodiment of this application. As shown in FIG. 10, the method may include the following steps.

Step 1001: The second communication apparatus sends a model sending request to the first communication apparatus, and correspondingly, the first communication apparatus receives the model sending request from the second communication apparatus.

The first communication apparatus may be any one of X communication apparatuses, and the model sending request may be used to request to send a submodel corresponding to the communication apparatus.

Step 1002: The first communication apparatus generates a key pair based on the model sending request.

The key pair generated by the first communication apparatus may include a public key of the first communication apparatus and a private key of the first communication apparatus.

Step 1003: The first communication apparatus sends the public key of the first communication apparatus to the second communication apparatus, and correspondingly, the second communication apparatus receives the public key from the first communication apparatus.

Step 1004: The second communication apparatus encrypts, based on the public key of the first communication apparatus, the submodel corresponding to the first communication apparatus.

Step 1005: The second communication apparatus sends the encrypted submodel to the first communication apparatus, and correspondingly, the first communication apparatus receives the encrypted submodel from the second communication apparatus.

Step 1006: The first communication apparatus decrypts the encrypted submodel based on the private key of the first communication apparatus to obtain the submodel corresponding to the first communication apparatus.

Step 1007: The first communication apparatus sends an acknowledgment for the submodel corresponding to the first communication apparatus to the second communication apparatus, and correspondingly, the second communication apparatus receives the acknowledgment for the submodel corresponding to the first communication apparatus from the first communication apparatus.

After the second communication apparatus sends submodels corresponding to the X communication apparatuses and first indication information to the communication apparatuses, the second communication apparatus and the X communication apparatuses may perform step 503 to step 505 in FIG. 5, to perform inference on data of the second communication apparatus.

Optionally, in an inference task process, when the second communication apparatus exchanges data with a next-hop communication apparatus of the second communication apparatus, and each of the X communication apparatuses exchanges data with a next-hop communication apparatus of the communication apparatus, both the second communication apparatus and the communication apparatus may encrypt the data, to improve data transmission security.

For example, data is encrypted in a form of a key pair. The data may be encrypted by using a method shown in FIG. 11.

Figure 11:
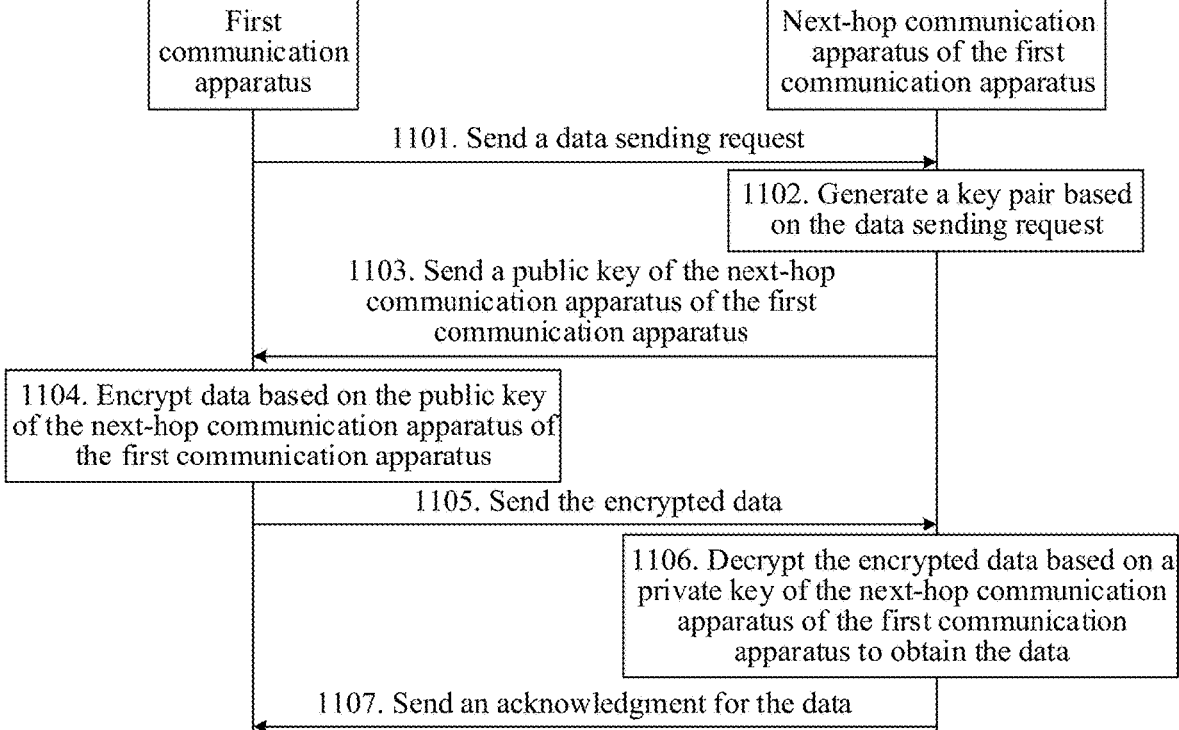
FIG. 11 is a schematic interaction diagram of a data encryption method according to an embodiment of this application.

In FIG. 11, an example in which a first communication apparatus sends encrypted data to a next-hop communication apparatus of the first communication apparatus is used to describe a data encryption method according to an embodiment of this application. The first communication apparatus may be any one of X communication apparatuses.

It may be understood that for an encryption manner used when a second communication apparatus sends data to a next-hop communication apparatus of the second communication apparatus, reference may be made to an encryption manner used when the first communication apparatus sends the data to the next-hop communication apparatus of the first communication apparatus. As shown in FIG. 11, the method may include the following steps.

Step 1101: The first communication apparatus sends a data sending request to the next-hop communication apparatus of the first communication apparatus, and correspondingly, the next-hop communication apparatus of the first communication apparatus receives the data sending request from the first communication apparatus.

The data sending request may be used to request to send data.

Step 1102: The next-hop communication apparatus of the first communication apparatus generates a key pair based on the data sending request.

The key pair generated by the next-hop communication apparatus of the first communication apparatus may include a public key of the next-hop communication apparatus of the first communication apparatus and a private key of the next-hop communication apparatus of the first communication apparatus.

Step 1103: The next-hop communication apparatus of the first communication apparatus sends the public key of the next-hop communication apparatus of the first communication apparatus to the first communication apparatus, and correspondingly, the first communication apparatus receives the public key of the next-hop communication apparatus from the first communication apparatus.

Step 1104: The first communication apparatus encrypts the data based on the public key of the next-hop communication apparatus of the first communication apparatus.

The data may be an inference result obtained by the first communication apparatus by performing inference based on a submodel corresponding to the first communication apparatus.

Step 1105: The first communication apparatus sends the encrypted data to the next-hop communication apparatus of the first communication apparatus, and correspondingly, the next-hop communication apparatus of the first communication apparatus receives the encrypted data from the first communication apparatus.

Step 1106: The next-hop communication apparatus of the first communication apparatus decrypts the encrypted data based on the private key of the next-hop communication apparatus of the first communication apparatus, to obtain the data.

Step 1107: The next-hop communication apparatus of the first communication apparatus sends an acknowledgment for the data to the first communication apparatus, and correspondingly, the first communication apparatus receives the acknowledgment for the data from the first communication apparatus.

Optionally, in an inference task process, when the second communication apparatus exchanges data with the next-hop communication apparatus of the second communication apparatus, and each of the X communication apparatuses exchanges data with a next-hop communication apparatus of the communication apparatus, after the communication apparatus sends the data to the next-hop communication apparatus of the communication apparatus, the next-hop communication apparatus may send an acknowledgment for the data to the communication apparatus after the data is successfully received, or may request, after the data fails to be received, the communication apparatus to retransmit the data.

Figure 12:
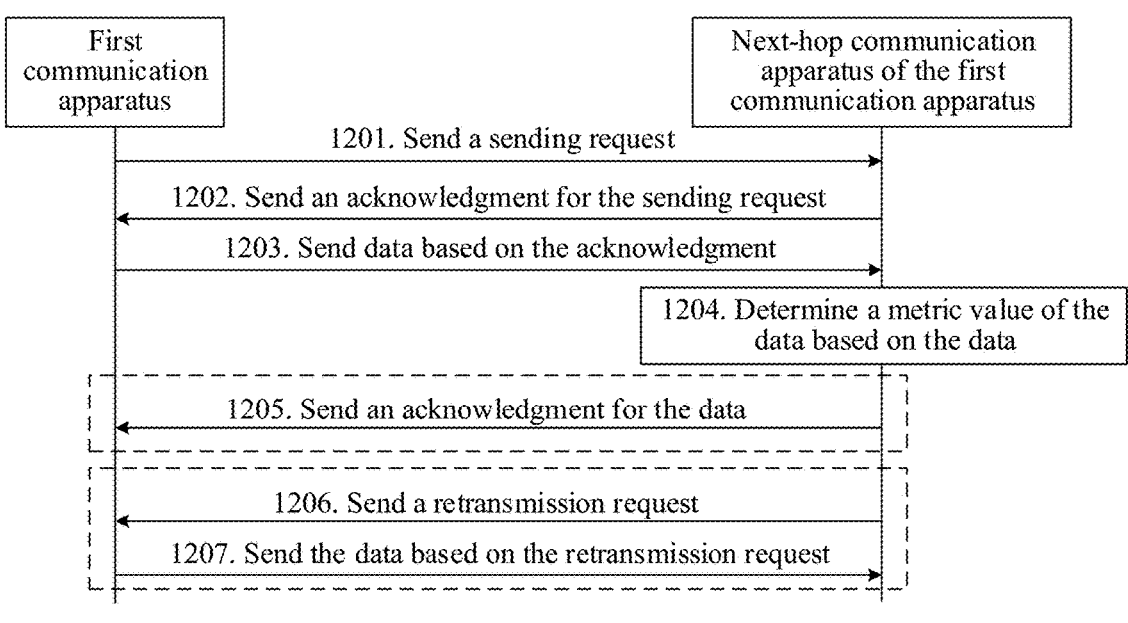
FIG. 12 is a schematic interaction diagram of a data transmission method according to an embodiment of this application.

In FIG. 12, an example in which a first communication apparatus sends data to a next-hop communication apparatus of the first communication apparatus is used to describe a data transmission method according to an embodiment of this application. The first communication apparatus may be any one of X communication apparatuses. It may be understood that for a data transmission manner between a second communication apparatus and a next-hop communication apparatus of the second communication apparatus, reference may be made to a data transmission manner between the first communication apparatus and the next-hop communication apparatus of the first communication apparatus. As shown in FIG. 12, the method may include the following steps.

Step 1201: The first communication apparatus sends a sending request to the next-hop communication apparatus of the first communication apparatus, and correspondingly, the next-hop communication apparatus of the first communication apparatus receives the sending request from the first communication apparatus.

The sending request may be used to request to send data. The data may be essentially an inference result obtained by the first communication apparatus by performing inference based on a submodel corresponding to the first communication apparatus.

Step 1202: The next-hop communication apparatus of the first communication apparatus sends an acknowledgment for the sending request to the first communication apparatus, and correspondingly, the first communication apparatus receives the acknowledgment for the sending request from the next-hop communication apparatus of the first communication apparatus.

After the next-hop communication apparatus of the first communication apparatus receives the sending request from the first communication apparatus, if the next-hop communication apparatus of the first communication apparatus determines to receive data of the first communication apparatus, the next-hop communication apparatus of the first communication apparatus may send the acknowledgment for the sending request to the first communication apparatus; or if the next-hop communication apparatus of the first communication apparatus rejects to receive data of the first communication apparatus, the next-hop communication apparatus of the first communication apparatus may send a rejection for the sending request to the first communication apparatus.

Step 1203: The first communication apparatus sends the data to the next-hop communication apparatus of the first communication apparatus based on the acknowledgment, and correspondingly, the next-hop communication apparatus of the first communication apparatus receives the data from the first communication apparatus.

The data sent by the first communication apparatus is essentially an inference result obtained by the first communication apparatus by performing inference based on the submodel corresponding to the first communication apparatus. The data sent by the first communication apparatus may also be described as an inference result sent by the first communication apparatus.

Step 1204: The next-hop communication apparatus of the first communication apparatus determines a metric value (metric) of the data based on the data.

The metric value may include one or more of the following: cyclic redundancy check (CRC), data robustness, or distortion.

The next-hop communication apparatus of the first communication apparatus may determine, based on the metric value of the data, whether the data is successfully received; and may perform step 1205 if the data is successfully received, or may perform step 1206 and step 1207 if the data fails to be received.

Step 1205: The next-hop communication apparatus of the first communication apparatus sends an acknowledgment for the data to the first communication apparatus, and correspondingly, the first communication apparatus receives the acknowledgment for the data from the next-hop communication apparatus of the first communication apparatus.

Step 1206: The next-hop communication apparatus of the first communication apparatus sends a retransmission request to the first communication apparatus, and correspondingly, the first communication apparatus receives the retransmission request from the next-hop communication apparatus of the first communication apparatus.

The retransmission request may be used to request the first communication apparatus to resend the data.

Step 1207: The first communication apparatus sends the data to the next-hop communication apparatus of the first communication apparatus based on the retransmission request.

When sending the data to the next-hop communication apparatus of the first communication apparatus based on the retransmission request, the first communication apparatus may determine, based on a quantity of retransmission times, whether to send the data based on the retransmission request. If the quantity of retransmission times is less than or equal to a predetermined quantity of retransmission times, the first communication apparatus may send the data based on the retransmission request. If the quantity of retransmission times is greater than a predetermined quantity of retransmission times, the first communication apparatus cannot send the data based on the retransmission request.

Figure 13:
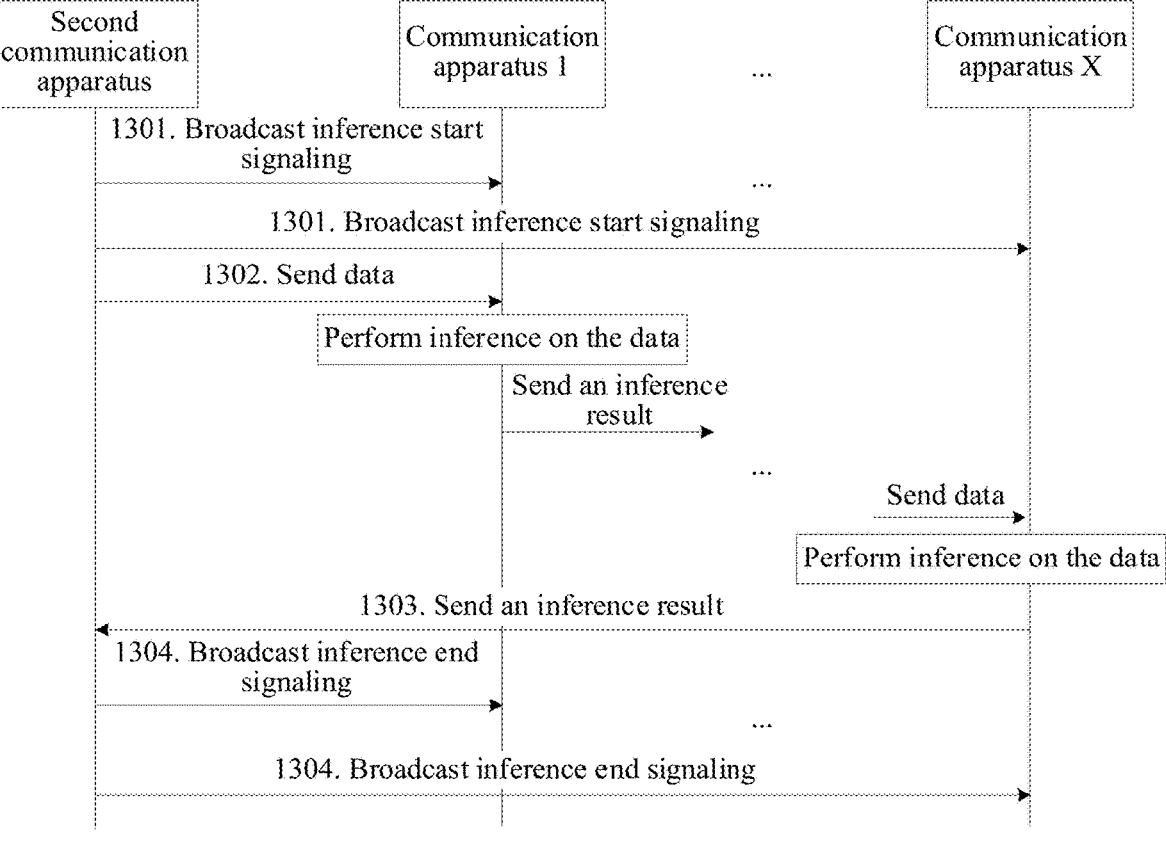
FIG. 13 is a schematic interaction diagram of an inference method according to an embodiment of this application.

Optionally, for the process of performing inference on the data of the second communication apparatus shown in step 503 to step 505 in FIG. 5, as shown in FIG. 13, before sending data to a communication apparatus 1 in X communication apparatuses, a second communication apparatus may further broadcast inference start signaling to indicate that inference starts, and after receiving an inference result sent by a communication apparatus X in the X communication apparatuses, the second communication apparatus may further broadcast inference end signaling to indicate that inference ends.

FIG. 13 shows an inference method according to an embodiment of this application. As shown in FIG. 13, the method may include the following steps.

Step 1301: A second communication apparatus broadcasts inference start signaling, and correspondingly, X communication apparatuses receive the inference start signaling from the second communication apparatus.

The inference start signaling may indicate the communication apparatus to start to perform inference on received data based on a submodel corresponding to the communication apparatus.

It should be noted that, after receiving the inference start signaling, the communication apparatus may first perform channel detection, and after detecting data sent by a previous-hop communication apparatus of the communication apparatus, the communication apparatus starts to perform inference on the received data based on the submodel corresponding to the communication apparatus.

Optionally, when the second communication apparatus sends first information to each of the X communication apparatuses, if the first information includes time information, the communication apparatus may perform channel detection based on the time information in the received first information, to avoid high power consumption caused by premature channel detection.

For descriptions of the first information, refer to the related descriptions of the first information in step 705. Details are not described again.

Step 1302: The second communication apparatus sends data to a communication apparatus 1 in the X communication apparatuses, and correspondingly, the communication apparatus 1 receives the data from the second communication apparatus.

The data sent by the second communication apparatus to the communication apparatus 1 is data on which inference needs to be performed in the second communication apparatus.

After receiving the data, the communication apparatus 1 may perform inference on the received data based on a submodel corresponding to the communication apparatus 1, to obtain an inference result, and send the inference result to a communication apparatus 2. The communication apparatus 2 may perform inference on the received data (that is, the inference result of the communication apparatus 1) based on a submodel corresponding to the communication apparatus 2, to obtain an inference result, and send the inference result to a communication apparatus 3, . . . , a communication apparatus X–1 may perform inference on the received data (that is, the inference result of the communication apparatus X–2) based on a submodel corresponding to the communication apparatus X–1, to obtain an inference result, and send the inference result to a communication apparatus X, and the communication apparatus X may perform inference on the received data (that is, the inference result of the communication apparatus X–1) based on a submodel corresponding to the communication apparatus X, to obtain an inference result, and perform step 1303.

Step 1303: The communication apparatus X in the X communication apparatuses sends the inference result to the second communication apparatus, and correspondingly, the second communication apparatus receives the inference result from the communication apparatus X.

Because the communication apparatus X is a last communication apparatus in the X communication apparatuses, the inference result sent by the communication apparatus X to the second communication apparatus is a final inference result.

Step 1304: The second communication apparatus broadcasts inference end signaling, and correspondingly, the X communication apparatuses receive the inference end signaling from the second communication apparatus.

The inference end signaling may indicate the communication apparatus to stop performing inference on the received data based on the submodel corresponding to the communication apparatus.

When receiving the inference end signaling, the X communication apparatuses may stop, based on the inference end signaling, performing inference on the received data based on the submodels corresponding to the communication apparatuses.

It should be noted that, when there are a plurality of rounds of data, the second communication apparatus may broadcast the inference end signaling after receiving inference results of the plurality of rounds of data.

The methods shown in FIG. 5 to FIG. 13 are applicable to an application scenario in which when a network device has an inference task, the network device schedules a plurality of terminal devices to jointly complete the inference task of the network device. When the terminal device has an inference task, as shown in FIG. 14, the terminal device may schedule X terminal devices via the network device to jointly complete the inference task of the terminal device.

Figure 14:
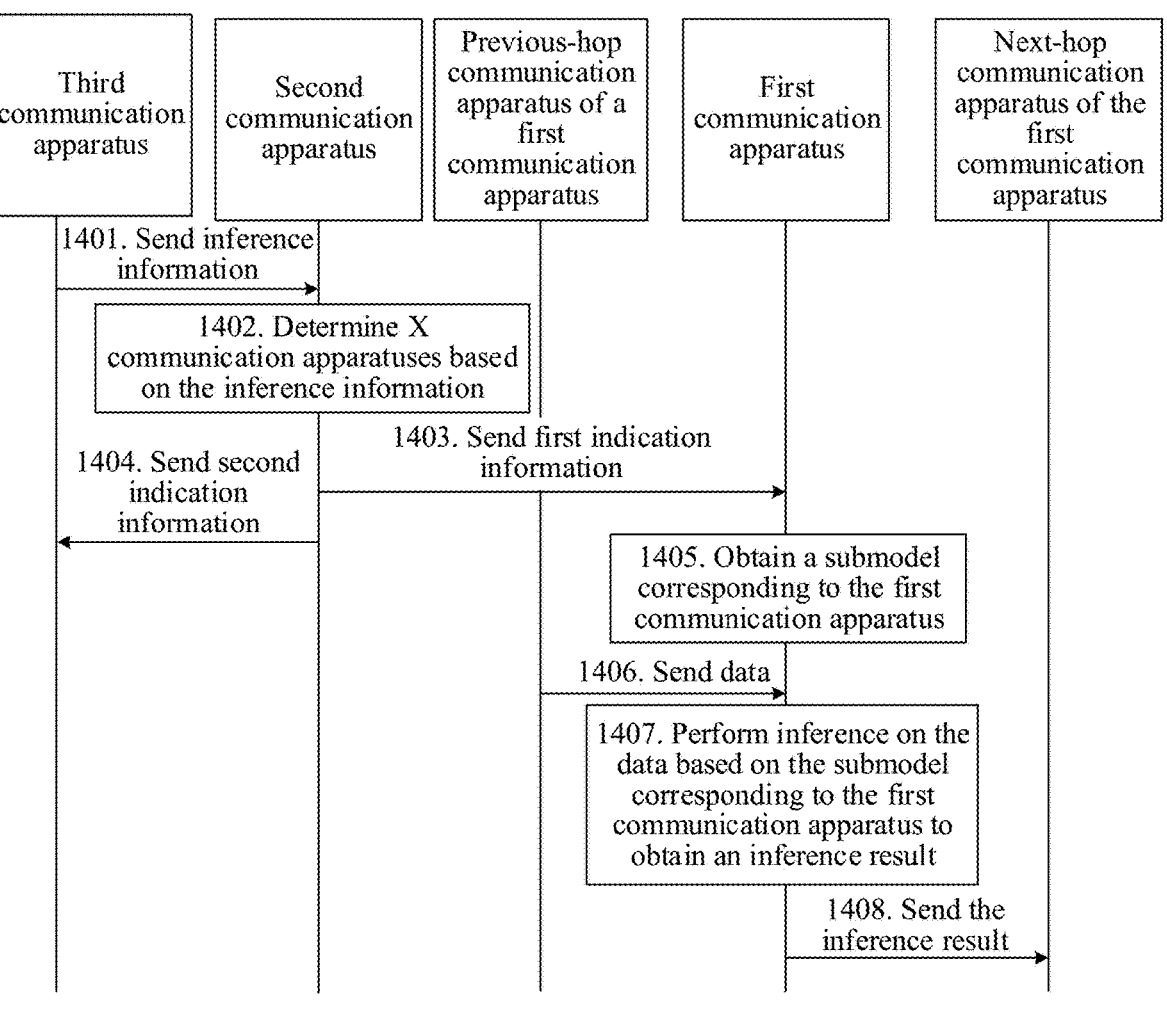
FIG. 14 is a schematic interaction diagram of a split inference method according to an embodiment of this application.

In FIG. 14, a third communication apparatus may be a terminal device that has an inference task in the communication system shown in FIG. 3, a second communication apparatus may be a network device that assists the third communication apparatus in completing the inference task that is in the communication system shown in FIG. 3, and a first communication apparatus may be a terminal device scheduled by the network device to assist the third communication apparatus in completing the inference task that is in the communication system shown in FIG. 3. The first communication apparatus may be any one of X terminal devices, and the X terminal devices may also be referred to as X communication apparatuses.

FIG. 14 shows a split inference method according to an embodiment of this application. As shown in FIG. 14, the method may include the following steps.

Step 1401: A third communication apparatus sends inference information to a second communication apparatus, and correspondingly, the second communication apparatus receives the inference information from the third communication apparatus.

Figure 15:
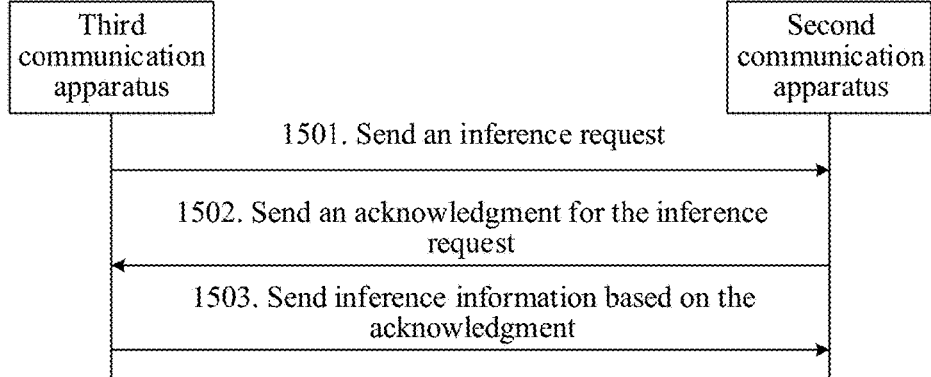
FIG. 15 is a schematic interaction diagram of an inference request method according to an embodiment of this application.

The third communication apparatus may directly send the inference information to the second communication apparatus, or may send, by using a method shown in FIG. 15, the inference information to the second communication apparatus after obtaining an acknowledgment from the second communication apparatus.

FIG. 15 is a schematic interaction diagram of an inference request method according to an embodiment of this application. As shown in FIG. 15, the method may include the following steps.

Step 1501: A third communication apparatus sends an inference request to a second communication apparatus, and correspondingly, the second communication apparatus receives the inference request from the third communication apparatus.

The inference request may include a type of an inference task, and the inference request may be used to request the second communication apparatus to perform the inference task.

For example, the type of the inference task may include a model type and a data type, the model type may be private or public, and the data type is private or public.

For example, as shown in Table 1, for an inference task 0, data may be private, and a model may be private. For an inference task 1, data may be private, and a model may be public. For an inference task 2, data may be public, and a model may be private. For an inference task 3, data may be public, and a model may be public.

TABLE 1

| Inference task | Data | Model |
|----------------|---------|---------|
| 0 | Private | Private |
| 1 | Private | Public |
| 2 | Public | Private |
| 3 | Public | Public |

It should be noted that when the third communication apparatus has an inference task, it indicates that a model needs to be used to perform inference on data of the third communication apparatus, to obtain an inference result. The model may be provided by the third communication apparatus.

Step 1502: The second communication apparatus sends an acknowledgment for the inference request to the third communication apparatus, and correspondingly, the third communication apparatus receives the acknowledgment for the inference request from the second communication apparatus.

When the second communication apparatus determines to perform the inference task of the third communication apparatus, the second communication apparatus may send an acknowledgment for the inference task to the third communication apparatus; or when the second communication apparatus determines not to perform the inference task of the third communication apparatus, the second communication apparatus may send a rejection for the inference task to the third communication apparatus.

Step 1503: The third communication apparatus sends inference information to the second communication apparatus based on the acknowledgment, and correspondingly, the second communication apparatus receives the inference information from the third communication apparatus.

The inference information may include one or more of the following: a data amount size, data precision, a quantity of layers of a model, an input/output dimension of the model, floating-point operations of each layer of the model, a type of an inference task, a priority of the inference task, or a maximum split amount of the model.

The priority of the inference task may be indicated by using a deadline of the inference task, or the priority of the inference task may be indicated by using another parameter. This is not limited.

For example, an earlier deadline of the inference task indicates a higher priority of the inference task.

Figure 16:
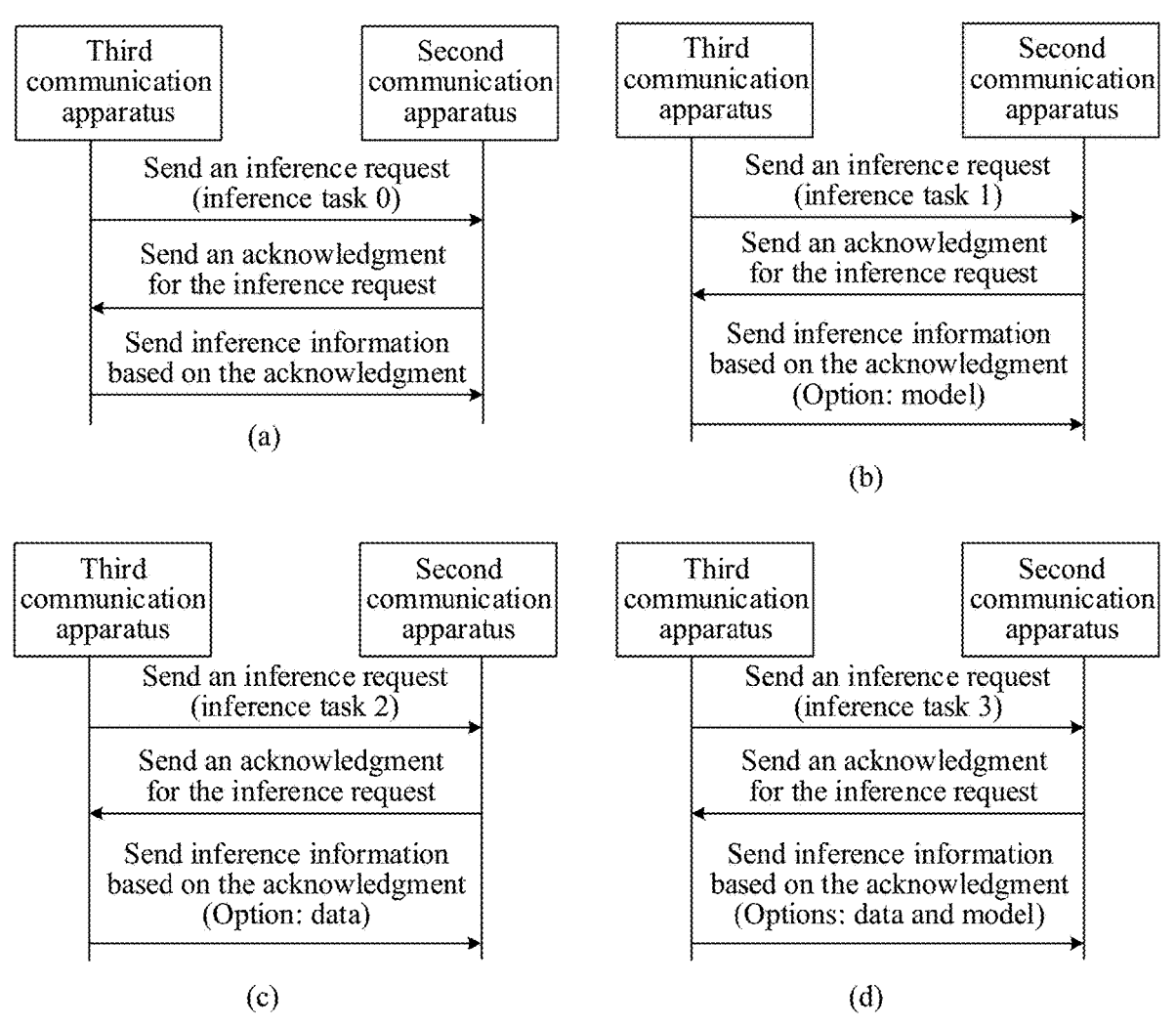
FIG. 16 is a schematic interaction diagram of an inference request method according to an embodiment of this application.

In a first possible design, as shown in (a) in FIG. 16, for an inference task 0, because both data and a model are private, the third communication apparatus may send inference information to the second communication apparatus, and does not need to send the data and the model to the second communication apparatus, thereby improving security and privacy of the data and the model of the third communication apparatus.

In this case, the second communication apparatus may determine, based on model-related information (such as a quantity of layers of the model, an input/output dimension of the model, floating-point operations of each layer of the model, and a maximum split amount of the model) in the inference information, submodel information corresponding to the communication apparatuses, and send the determined submodel information corresponding to the communication apparatuses to the third communication apparatus. The third communication apparatus splits the model based on the submodel information, to obtain submodels corresponding to the communication apparatuses, and sends the submodels obtained through splitting to the X communication apparatuses.

The submodel information may include a quantity of layers corresponding to the submodel.

Optionally, the submodel information sent by the third communication apparatus to the second communication apparatus further includes a connection relationship between the submodels and a sequence of the submodels.

In addition, because the data is private, the third communication apparatus may send the data to a communication apparatus 1 in the X communication apparatuses, to prevent the data from being leaked to the second communication apparatus, thereby improving data security and privacy.

In a second possible design, as shown in (b) in FIG. 16, for an inference task 1, because data is private and a model is public, the third communication apparatus may send inference information and the model to the second communication apparatus, and does not need to send the data to the second communication apparatus, thereby improving security and privacy of the data of the third communication apparatus.

When sending the model to the second communication apparatus, the third communication apparatus may send a structure and a parameter of the model. If the model is a general-purpose pre-training model, the third communication apparatus may send identification information of the model, to reduce communication overheads. The second communication apparatus may determine the structure and the parameter of the model based on the identification information of the model.

In this case, the second communication apparatus may split the model based on the inference information and the model, and send submodels obtained through splitting to the X communication apparatuses, to avoid power consumption caused by splitting the model by the third communication apparatus.

It may be understood that the third communication apparatus may not send the model to the second communication apparatus. In this case, the second communication apparatus may determine submodel information based on model-related information (such as a quantity of layers of the model, an input/output dimension of the model, floating-point operations of each layer of the model, and a maximum split amount of the model) in the inference information, and send the determined submodel information to the third communication apparatus. The third communication apparatus splits the model based on the submodel information, and sends the submodels obtained through splitting to the X communication apparatuses.

The submodel information may include a quantity of layers corresponding to the submodel.

In addition, because the data is private, when performing inference on the data, the third communication apparatus may send the data to a communication apparatus 1 in the X communication apparatuses, to prevent the data from being leaked to the second communication apparatus, thereby improving data security and privacy.

In a third possible design, as shown in (c) in FIG. 16, for an inference task 2, because data is public and a model is private, the third communication apparatus may send inference information and the data to the second communication apparatus, and does not need to send the model to the second communication apparatus, thereby improving security and privacy of the model of the third communication apparatus.

In this case, the second communication apparatus may determine submodel information based on model-related information (such as a quantity of layers of the model, an input/output dimension of the model, floating-point operations of each layer of the model, and a maximum split amount of the model) in the inference information, and send the determined submodel information to the third communication apparatus. The third communication apparatus splits the model based on the submodel information, and sends submodels obtained through splitting to the X communication apparatuses.

The submodel information may include a quantity of layers corresponding to the submodel.

In addition, because the data is public, when performing inference on the data, the third communication apparatus may send data to the second communication apparatus, and the second communication apparatus sends the data to a communication apparatus 1 in the X communication apparatuses; or the third communication apparatus may directly send the data to a communication apparatus 1 in the X communication apparatuses.

When the third communication apparatus directly sends the data to the communication apparatus 1 in the X communication apparatuses, the data can be prevented from being leaked to the second communication apparatus, thereby improving data security and privacy.

In a fourth possible design, as shown in (d) in FIG. 16, for an inference task 3, because both data and a model are public, the third communication apparatus may send inference information, the data, and the model to the second communication apparatus.

When sending the model to the second communication apparatus, the third communication apparatus may send a structure and a parameter of the model. If the model is a general-purpose pre-training model, the third communication apparatus may send identification information of the model, to reduce communication overheads. The second communication apparatus may determine the structure and the parameter of the model based on the identification information of the model.

In this case, the second communication apparatus may split the model based on the inference information and the model, and send submodels obtained through splitting to the X communication apparatuses, to avoid power consumption caused by splitting the model by the third communication apparatus.

It may be understood that the third communication apparatus may not send the model to the second communication apparatus. In this case, the second communication apparatus may determine submodel information based on model-related information (such as a quantity of layers of the model, an input/output dimension of the model, floating-point operations of each layer of the model, and a maximum split amount of the model) in the inference information, and send the determined submodel information to the third communication apparatus. The third communication apparatus splits the model based on the submodel information, and sends the submodels obtained through splitting to the X communication apparatuses.

The submodel information may include a quantity of layers corresponding to the submodel.

In addition, because the data is public, when performing inference on the data, the third communication apparatus may send data to the second communication apparatus, and the second communication apparatus sends the data to a communication apparatus 1 in the X communication apparatuses; or the third communication apparatus may directly send the data to a communication apparatus 1 in the X communication apparatuses.

When the third communication apparatus directly sends the data to the communication apparatus 1 in the X communication apparatuses, the data can be prevented from being leaked to the second communication apparatus, thereby improving data security and privacy.

Based on the foregoing four possible designs, the third communication apparatus may send the inference information to the second communication apparatus, and the second communication apparatus may schedule, based on the infer-ence information, the X communication apparatuses to complete the inference task of the third communication apparatus.

Step 1402: The second communication apparatus determines the X communication apparatuses based on the inference information.

The X communication apparatuses may include the third communication apparatus, that is, the third communication apparatus may also participate in inference.

In a first possible design, if the model is public and the third communication apparatus sends the model to the second communication apparatus, the second communication apparatus may split, based on the foregoing descriptions in FIG. 7 and FIG. 8, dynamic planning, and the model and state information of the communication apparatus that are sent by the third communication apparatus, the model when determining the X communication apparatuses, determine a sorting result of the X communication apparatuses and a submodel corresponding to each communication apparatus, determine a previous-hop communication apparatus and a next-hop communication apparatus of each of the X communication apparatuses based on the sorting result, and send the submodel corresponding to each of the X communication apparatuses and first indication information to the communication apparatus.

The first indication information indicates the previous-hop communication apparatus and the next-hop communication apparatus of the communication apparatus.

If the model is public but the third communication apparatus does not send the model to the second communication apparatus, or if the model is private, the second communication apparatus may perform model-based processing based on the model-related information in the inference information and state information of the communication apparatus when determining the X communication apparatuses, determine a sorting result of the X communication apparatuses and submodel information corresponding to each communication apparatus, determine a previous-hop communication apparatus and a next-hop communication apparatus of each of the X communication apparatuses based on the sorting result, send first indication information to each of the X communication apparatuses, and send the submodel information corresponding to each communication apparatus to the third communication apparatus.

For specific descriptions of the first possible design, refer to the related descriptions in FIG. 7 and FIG. 8. Details are not described again.

In a second possible design, if the model is public and the third communication apparatus sends the model to the second communication apparatus, the second communication apparatus may determine the X communication apparatuses based on the foregoing descriptions in FIG. 9, and the model and state information of the communication apparatus that are sent by the third communication apparatus, then complete model splitting based on the X communication apparatuses and determine a sorting result of the X communication apparatuses, determine a previous-hop communication apparatus and a next-hop communication apparatus of each of the X communication apparatuses based on the sorting result, and send a submodel corresponding to each of the X communication apparatuses and first indication information to the communication apparatus.

If the model is public but the third communication apparatus does not send the model to the second communication apparatus, or if the model is private, the second communication apparatus may determine the X communication apparatuses based on the model-related information in the inference information and state information of the communication apparatus, then complete model-based processing based on the X communication apparatuses and determine a sorting result of the X communication apparatuses, determine a previous-hop communication apparatus and a next-hop communication apparatus of each of the X communication apparatuses based on the sorting result, send first indication information to each of the X communication apparatuses, and send submodel information corresponding to each communication apparatus to the third communication apparatus.

For specific descriptions of the second possible design, refer to the related descriptions in FIG. 9. Details are not described again.

Based on the first possible design or the second possible design, after the second communication apparatus determines and sorts the X communication apparatuses, it may be determined that:

When the first communication apparatus is a communication apparatus 1 in the X communication apparatuses, the previous-hop communication apparatus of the first communication apparatus is the third communication apparatus, and the next-hop communication apparatus of the first communication apparatus is a communication apparatus 2 in the X communication apparatuses.

When the first communication apparatus is a communication apparatus k in the X communication apparatuses, the previous-hop communication apparatus of the first communication apparatus is a communication apparatus k−1 in the X communication apparatuses, and the next-hop communication apparatus of the first communication apparatus is a communication apparatus k+1 in the X communication apparatuses, where k is greater than or equal to 2, and k is less than or equal to X−1.

When the first communication apparatus is a communication apparatus X in the X communication apparatuses, the previous-hop communication apparatus of the first communication apparatus is a communication apparatus X−1 in the X communication apparatuses, and the next-hop communication apparatus of the first communication apparatus is the third communication apparatus.

Step 1403: The second communication apparatus sends the first indication information to the first communication apparatus.

The first communication apparatus may be any one of the X communication apparatuses, and the first indication information may indicate the previous-hop communication apparatus and the next-hop communication apparatus of the communication apparatus.

Step 1404: The second communication apparatus sends second indication information to the third communication apparatus.

The second indication information may indicate a communication apparatus 1 and a communication apparatus X in the X communication apparatuses, where X is greater than or equal to 1.

The third communication apparatus may determine, based on the second indication information, to send data to the communication apparatus 1, and receive an inference result from the communication apparatus X.

It should be noted that there is no limitation on a sequence of performing step 1403 and step 1404. Step 1403 may be performed before step 1404; step 1404 may be performed before step 1403; or step 1403 and step 1404 may be performed simultaneously. This is not limited.

Step 1405: The first communication apparatus obtains the submodel corresponding to the first communication apparatus.

If the model is public and the third communication apparatus sends the model to the second communication apparatus, the second communication apparatus may split the model to obtain a submodel corresponding to each communication apparatus, and send the submodel corresponding to each communication apparatus to the communication apparatus.

If the model is public but the third communication apparatus does not send the model to the second communication apparatus, the second communication apparatus may process the model based on model-related information in the inference information, to obtain submodel information corresponding to each communication apparatus, and send the submodel information to the third communication apparatus. The third communication apparatus may split the model based on the submodel information corresponding to each communication apparatus, to obtain a submodel corresponding to each communication apparatus, and send the submodel corresponding to each communication apparatus to the communication apparatus.

Optionally, if the third communication apparatus sends the submodel corresponding to each communication apparatus to the communication apparatus, before the third communication apparatus sends the submodel corresponding to the communication apparatus, the second communication apparatus may send a model sending indication to the third communication apparatus, and the third communication apparatus sends, based on the model sending indication, the submodel corresponding to each communication apparatus to the communication apparatus. After the third communication apparatus completes sending of the submodel corresponding to each communication apparatus, the third communication apparatus may further send, to the second communication apparatus, an acknowledgment that the model sending is completed.

Step 1406: The first communication apparatus receives data from the previous-hop communication apparatus of the first communication apparatus.

Step 1407: The first apparatus performs inference on the received data based on the submodel corresponding to the first communication apparatus, to obtain an inference result.

Step 1408: The first communication apparatus sends the inference result to the next-hop communication apparatus of the first communication apparatus.

Figure 17:
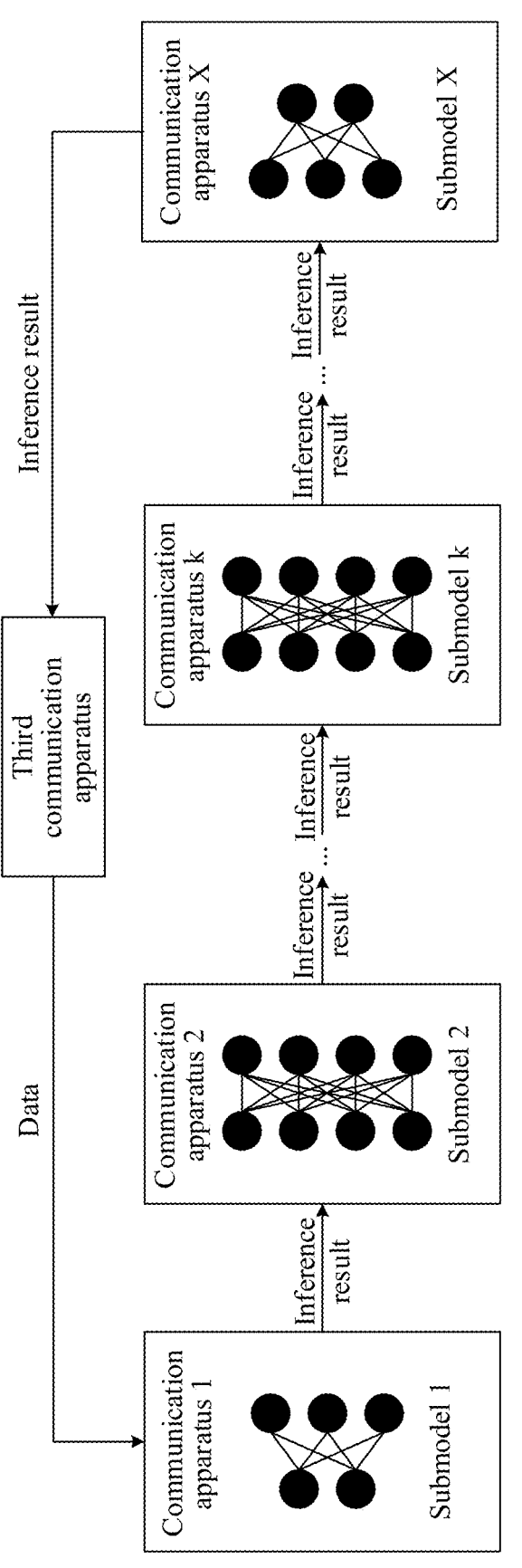
FIG. 17 is a diagram of a split inference method according to an embodiment of this application.

As shown in FIG. 17, when the first communication apparatus is a communication apparatus 1 in the X communication apparatuses, the communication apparatus 1 may receive data sent by the third communication apparatus. The communication apparatus 1 may perform, based on a submodel (for example, a submodel 1) corresponding to the communication apparatus 1, inference on the data sent by the third communication apparatus, to obtain an inference result, and send the inference result to a communication apparatus 2 in the X communication apparatuses.

It should be noted that the data sent by the third communication apparatus to the communication apparatus 1 is data on which inference needs to be performed in the third communication apparatus. The inference result obtained by the communication apparatus 1 by performing inference on the data is essentially data. Therefore, the inference result sent by the communication apparatus 1 to the communication apparatus 2 may also be referred to as data sent by the communication apparatus 1 to the communication apparatus 2.

In addition, when the data is public, the third communication apparatus may send the data to the communication apparatus 1 via the second communication apparatus. This is not limited.

As shown in FIG. 17, when the first communication apparatus is a communication apparatus k in the X communication apparatuses, the communication apparatus k may receive data sent by a communication apparatus k−1 in the X communication apparatuses, perform, based on a submodel (for example, a submodel k) corresponding to the communication apparatus k, inference on the data sent by the communication apparatus k−1, to obtain an inference result, and send the inference result to a communication apparatus k+1 in the X communication apparatuses.

It should be noted that, the data sent by the communication apparatus k−1 to the communication apparatus k is an inference result obtained by the communication apparatus k−1 by performing inference based on a submodel (for example, a submodel k−1) corresponding to the communication apparatus k−1. The inference result obtained by the communication apparatus k by performing inference on the received data is essentially data. Therefore, the inference result sent by the communication apparatus k to the communication apparatus k+1 may also be referred to as data sent by the communication apparatus k to the communication apparatus k+1.

As shown in FIG. 17, when the first communication apparatus is a communication apparatus X in the X communication apparatuses, the communication apparatus X may receive data sent by a communication apparatus X−1 in the X communication apparatuses, perform, based on a submodel (for example, a submodel X) corresponding to the communication apparatus X, inference on the data sent by the communication apparatus X−1, to obtain an inference result, and send the inference result to the third communication apparatus.

It should be noted that the data sent by the communication apparatus X−1 to the communication apparatus X is an inference result obtained by the communication apparatus X−1 by performing inference based on a submodel (for example, a submodel X−1) corresponding to the communication apparatus X−1. Because the communication apparatus X is a last communication apparatus in the X communication apparatuses in this case, the communication apparatus X performs inference on the received data, and an obtained inference result is a final inference result. The communication apparatus X sends the final inference result to the third communication apparatus, to complete inference.

In conclusion, inference results obtained by first X−1 communication apparatuses in the X communication apparatuses through inference based on the submodels may be considered as intermediate inference results generated in the entire inference task process, and an inference result obtained by the last communication apparatus (that is, the communication apparatus X) through inference based on the submodel may be considered as the final inference result in the entire inference task process.

According to the method shown in FIG. 14, when the second communication apparatus schedules the X communication apparatuses to perform the inference task of the third communication apparatus, because the third communication apparatus and the X communication apparatuses are all terminal devices, each terminal device may directly obtain data from a previous-hop terminal device, and send, to a next-hop terminal device, an inference result obtained by the terminal device through inference. Compared with a case in which a terminal device obtains data from a central server and sends, to the central server, an inference result obtained by the terminal device through inference, and the central server sends the inference result to a next terminal device, in this embodiment of this application, a quantity of times of transmitting the inference result can be reduced and communication overheads can be reduced. Because the X communication apparatuses complete the inference task of the third communication apparatus based on the X submodels, a computing power requirement of the third communication apparatus can be reduced, and a risk of leaking original data of the third communication apparatus to a central server can also be reduced.

Based on the foregoing descriptions in FIG. 14 to FIG. 17, when sending the submodels corresponding to the X communication apparatuses to the communication apparatuses, the second communication apparatus or the third communication apparatus may encrypt the submodels, to improve transmission security of the submodels.

For specific descriptions of sending, by the second communication apparatus in an encryption manner, the submodels corresponding to the X communication apparatuses to the communication apparatuses, refer to the related descriptions of sending, by the second communication apparatus, the encrypted submodel to the first communication apparatus in FIG. 10. Details are not described again.

For specific descriptions of sending, by the third communication apparatus in an encryption manner, the submodels corresponding to the X communication apparatuses to the communication apparatuses, still refer to the related descriptions of sending, by the second communication apparatus, the encrypted submodel to the first communication apparatus in FIG. 10. Details are not described again.

Optionally, in an inference task process, when the third communication apparatus exchanges data with a next-hop communication apparatus of the third communication apparatus, and each of the X communication apparatuses exchanges data with a next-hop communication apparatus of the communication apparatus, both the third communication apparatus and the communication apparatus may encrypt the data, to improve data transmission security.

For specific descriptions of sending, by the third communication apparatus, the data to the next-hop communication apparatus of the third communication apparatus in an encryption manner, refer to the related descriptions of sending, by the first communication apparatus, the encrypted data to the next-hop communication apparatus of the first communication apparatus in FIG. 11. Details are not described again.

For specific descriptions of sending, by each of the X communication apparatuses, the data to the next-hop communication apparatus of the communication apparatus, still refer to the related descriptions of sending, by the first communication apparatus, the encrypted data to the next-hop communication apparatus of the first communication apparatus in FIG. 11. Details are not described again.

Optionally, in an inference task process, when the third communication apparatus exchanges data with a next-hop communication apparatus of the third communication apparatus, and each of the X communication apparatuses exchanges data with a next-hop communication apparatus of the communication apparatus, after the communication apparatus sends the data to the next-hop communication apparatus of the communication apparatus, the next-hop communication apparatus may send an acknowledgment for the data to the communication apparatus after the data is successfully received, or may request, after the data fails to be received, the communication apparatus to retransmit the data.

For specific descriptions of sending, by the third communication apparatus, the data to the next-hop communication apparatus of the third communication apparatus, refer to the related descriptions of sending, by the first communication apparatus, the data to the next-hop communication apparatus of the first communication apparatus in FIG. 12. Details are not described again.

For specific descriptions of sending, by each of the X communication apparatuses, the data to the next-hop communication apparatus of the communication apparatus, still refer to the related descriptions of sending, by the first communication apparatus, the data to the next-hop communication apparatus of the first communication apparatus in FIG. 12. Details are not described again.

Optionally, in an inference task process, before the third communication apparatus sends data to a communication apparatus 1 in the X communication apparatuses, the second communication apparatus may broadcast inference start signaling to indicate that inference starts, and after the third communication apparatus receives an inference result sent by a communication apparatus X in the X communication apparatuses, the second communication apparatus may further broadcast inference end signaling to indicate that inference ends.

For descriptions of the inference start signaling and the inference end signaling, refer to related descriptions in FIG. 13. Details are not described again.

The solutions provided in embodiments of this application are mainly described above from the perspective of interaction between the devices. It may be understood that, to implement the foregoing functions, each device includes a corresponding hardware structure and/or a corresponding software module for performing each function. A person skilled in the art should be easily aware that algorithms and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, each device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 18:
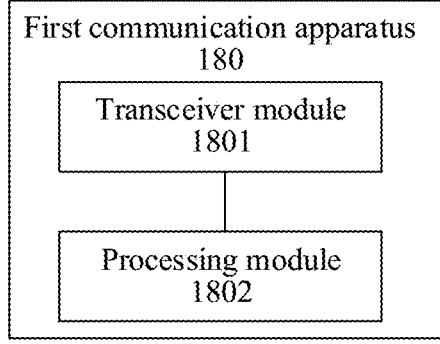
FIG. 18 is a schematic composition diagram of a first communication apparatus according to an embodiment of this application.

When each functional module is obtained through division based on each corresponding function, FIG. 18 shows a first communication apparatus 180. The first communication apparatus 180 may perform actions performed by the first communication apparatus in FIG. 5 to FIG. 17.

The first communication apparatus 180 may include a transceiver module 1801 and a processing module 1802. For example, the first communication apparatus 180 may be a first communication apparatus, or may be a chip used in the first communication apparatus, or another combined component or part that has a function of the first communication apparatus. When the first communication apparatus 180 is the first communication apparatus, the transceiver module 1801 may be a transceiver, and the transceiver may include an antenna, a radio frequency circuit, and the like; and the processing module 1802 may be a processor (or a processing circuit), for example, a baseband processor, and the baseband processor may include one or more CPUs. When the first communication apparatus 180 is a component having a function of the first communication apparatus, the transceiver module 1801 may be a radio frequency unit, and the processing module 1802 may be a processor (or a processing circuit), for example, a baseband processor. When the first communication apparatus 180 is a chip system, the transceiver module 1801 may be an input/output interface of a chip (for example, a baseband chip); and the processing module 1802 may be a processor (or a processing circuit) of the chip system, and may include one or more central processing units. It should be understood that the transceiver module 1801 in this embodiment of this application may be implemented by a transceiver or a transceiver-related circuit component, and the processing module 1802 may be implemented by a processor or a processor-related circuit component (or referred to as a processing circuit).

For example, the transceiver module 1801 may be configured to perform all receiving and sending operations performed by the first communication apparatus in the embodiments shown in FIG. 5 to FIG. 17, and/or configured to support another process of the technology described in this specification. The processing module 1802 may be configured to perform all operations, except the receiving and sending operations, performed by the first communication apparatus in the embodiments shown in FIG. 5 to FIG. 17, and/or configured to support another process of the technology described in this specification.

In another possible implementation, the transceiver module 1801 in FIG. 18 may be replaced with a transceiver, and a function of the transceiver module 1801 may be integrated into the transceiver. The processing module 1802 may be replaced with a processor, and a function of the processing module 1802 may be integrated into the processor. The first communication apparatus 180 shown in FIG. 18 may further include a memory.

Figure 19:
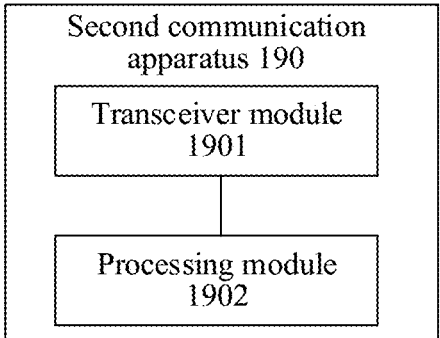
FIG. 19 is a schematic composition diagram of a second communication apparatus according to an embodiment of this application.

When each functional module is obtained through division based on each corresponding function, FIG. 19 shows a second communication apparatus 190. The second communication apparatus 190 may perform actions performed by the second communication apparatus in FIG. 5 to FIG. 17.

The second communication apparatus 190 may include a transceiver module 1901 and a processing module 1902. For example, the second communication apparatus 190 may be a second communication apparatus, or may be a chip used in the second communication apparatus, or another combined component or part that has a function of the second communication apparatus. When the second communication apparatus 190 is the second communication apparatus, the transceiver module 1901 may be a transceiver, and the transceiver may include an antenna, a radio frequency circuit, and the like; and the processing module 1902 may be a processor (or a processing circuit), for example, a baseband processor, and the baseband processor may include one or more CPUs. When the second communication apparatus 190 is a component having a function of the second communication apparatus, the transceiver module 1901 may be a radio frequency unit, and the processing module 1902 may be a processor (or a processing circuit), for example, a baseband processor. When the second communication apparatus 190 is a chip system, the transceiver module 1901 may be an input/output interface of a chip (for example, a baseband chip); and the processing module 1902 may be a processor (or a processing circuit) of the chip system, and may include one or more central processing units. It should be understood that the transceiver module 1901 in this embodiment of this application may be implemented by a transceiver or a transceiver-related circuit component, and the processing module 1902 may be implemented by a processor or a processor-related circuit component (or referred to as a processing circuit).

For example, the transceiver module 1901 may be configured to perform all receiving and sending operations performed by the second communication apparatus in the embodiments shown in FIG. 5 to FIG. 17, and/or configured to support another process of the technology described in this specification. The processing module 1902 may be configured to perform all operations, except the receiving and sending operations, performed by the second communication apparatus in the embodiments shown in FIG. 5 to FIG. 17, and/or configured to support another process of the technology described in this specification.

In another possible implementation, the transceiver module 1901 in FIG. 19 may be replaced with a transceiver, and a function of the transceiver module 1901 may be integrated into the transceiver. The processing module 1902 may be replaced with a processor, and a function of the processing module 1902 may be integrated into the processor. The second communication apparatus 190 shown in FIG. 19 may further include a memory.

Figure 20:
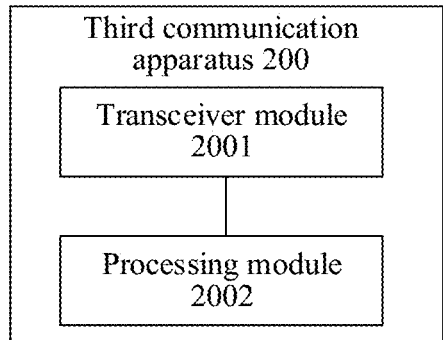
FIG. 20 is a schematic composition diagram of a third communication apparatus according to an embodiment of this application.

When each functional module is obtained through division based on each corresponding function, FIG. 20 shows a third communication apparatus 200. The third communication apparatus 200 may perform actions performed by the third communication apparatus in FIG. 5 to FIG. 17.

The third communication apparatus 200 may include a transceiver module 2001 and a processing module 2002. For example, the third communication apparatus 200 may be a third communication apparatus, or may be a chip used in the third communication apparatus or another combined component or part that has a function of the third communication apparatus. When the third communication apparatus 200 is the third communication apparatus, the transceiver module 2001 may be a transceiver, and the transceiver may include an antenna, a radio frequency circuit, and the like; and the processing module 2002 may be a processor (or a processing circuit), for example, a baseband processor, and the baseband processor may include one or more CPUs. When the third communication apparatus 200 is a component having a function of the third communication apparatus, the transceiver module 2001 may be a radio frequency unit, and the processing module 2002 may be a processor (or a processing circuit), for example, a baseband processor. When the third communication apparatus 200 is a chip system, the transceiver module 2001 may be an input/output interface of a chip (for example, a baseband chip); and the processing module 2002 may be a processor (or a processing circuit) of the chip system, and may include one or more central processing units. It should be understood that the transceiver module 2001 in this embodiment of this application may be implemented by a transceiver or a transceiver-related circuit component, and the processing module 2002 may be implemented by a processor or a processor-related circuit component (or referred to as a processing circuit).

For example, the transceiver module 2001 may be configured to perform all receiving and sending operations performed by the third communication apparatus in the embodiments shown in FIG. 5 to FIG. 17, and/or configured to support another process of the technology described in this specification. The processing module 2002 may be configured to perform all operations, except the receiving and sending operations, performed by the third communication apparatus in the embodiments shown in FIG. 5 to FIG. 17, and/or configured to support another process of the technology described in this specification.

In another possible implementation, the transceiver module 2001 in FIG. 20 may be replaced with a transceiver, and a function of the transceiver module 2001 may be integrated into the transceiver. The processing module 2002 may be replaced with a processor, and a function of the processing module 2002 may be integrated into the processor. The third communication apparatus 200 shown in FIG. 20 may further include a memory.

An embodiment of this application further provides a computer program product. When the computer program product is executed by a computer, functions of any one of the foregoing method embodiments may be implemented.

An embodiment of this application further provides a computer program. When the computer program is executed by a computer, functions of any one of the foregoing method embodiments may be implemented.

Embodiments of this application further provide a computer-readable storage medium. All or some of procedures in the foregoing method embodiments may be implemented by a computer program instructing related hardware. The program may be stored in the foregoing computer-readable storage medium. When the program is executed, the procedures in the foregoing method embodiments may be performed. The computer-readable storage medium may be an internal storage unit in the terminal (including a data transmitter and/or a data receiver) in any one of the foregoing embodiments, for example, a hard disk or memory of the terminal. The foregoing computer-readable storage medium may also be an external storage device of the foregoing terminal, for example, a plug-in hard disk, a smart memory card (SMC), a secure digital (SD) card, and a flash card (flash card) that are configured on the foregoing terminal. The computer-readable storage medium may further include both an internal storage unit and an external storage device of the foregoing terminal. The computer-readable storage medium is configured to store the computer program and other programs and data required by the foregoing terminal. The computer-readable storage medium may be further configured to temporarily store data that has been output or is to be output.

It should be noted that the terms "first", "second", and the like in this specification, claims, and accompanying drawings of this application are used to distinguish between different objects, but are not used to describe a specific order. In addition, the terms "including", "having", and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" usually indicates an "or" relationship between the associated objects. "At least one of the following items (pieces)" or a similar expression thereof means any combination of these items, including any combination of singular items (pieces) or plural items (pieces). For example, at least one of a, b, or c may indicate a, b, c, a and b, a and c, b and c, or a, b, and c, where a, b, and c may be singular or plural.

Based on the descriptions of the implementations, a person skilled in the art may clearly understand that for the purpose of convenient and brief descriptions, division into the functional modules is merely used as an example for description. In an actual application, the functions can be allocated to different functional modules for implementation based on a requirement. In other words, an inner structure of an apparatus is divided into different functional modules, to implement all or some of the foregoing described functions.

In the several embodiments provided in this application, it should be understood that the disclosed apparatus and method may be implemented in other manners. For example, the described apparatus embodiment is merely an example. For example, division into the modules or units is merely logical function division, and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, and may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods in embodiments of this application. The foregoing storage medium includes any medium that can store program code, such as a USB flash drive, a removable hard disk, a ROM, a RAM, a magnetic disk, or an optical disc.

What is claimed is:

1. A split inference method, comprising:

receiving, by a first communication apparatus, first indication information from a second communication apparatus, wherein the first indication information indicates a previous-hop communication apparatus and a next-hop communication apparatus of the first communication apparatus, and the previous-hop communication apparatus and the next-hop communication apparatus of the first communication apparatus each comprise at least one terminal device;

receiving, by the first communication apparatus, data from the previous-hop communication apparatus of the first communication apparatus;

performing, by the first communication apparatus, inference on the data based on a submodel corresponding to the first communication apparatus, to obtain an inference result, wherein the submodel corresponding to the first communication apparatus is one of X submodels obtained by splitting a model based on X communication apparatuses, a communication apparatus x in the X communication apparatuses corresponds to an $x^{th}$ submodel, and the X communication apparatuses comprise the first communication apparatus, wherein x is greater than or equal to 1, and x is less than or equal to X; and sending, by the first communication apparatus, the inference result to the next-hop communication apparatus of the first communication apparatus.

2. The method according to claim 1, wherein when the first communication apparatus is a communication apparatus k in the X communication apparatuses, the previous-hop communication apparatus of the first communication apparatus is a communication apparatus k−1 in the X communication apparatuses, and the next-hop communication apparatus of the first communication apparatus is a communication apparatus k+1 in the X communication apparatuses, wherein k is greater than or equal to 2, and k is less than or equal to X−1;

when the first communication apparatus is a communication apparatus 1 in the X communication apparatuses, the previous-hop communication apparatus of the first communication apparatus is the second communication apparatus, and the next-hop communication apparatus of the first communication apparatus is a communication apparatus 2 in the X communication apparatuses;

when the first communication apparatus is a communication apparatus X in the X communication apparatuses, the previous-hop communication apparatus of the first communication apparatus is a communication apparatus X−1 in the X communication apparatuses, and the next-hop communication apparatus of the first communication apparatus is the second communication apparatus;

when the first communication apparatus is a communication apparatus 1 in the X communication apparatuses, the previous-hop communication apparatus of the first communication apparatus is a third communication apparatus, and the next-hop communication apparatus of the first communication apparatus is a communication apparatus 2 in the X communication apparatuses; or when the first communication apparatus is a communication apparatus X in the X communication apparatuses, the previous-hop communication apparatus of the first communication apparatus is a communication apparatus X−1 in the X communication apparatuses, and the next-hop communication apparatus of the first communication apparatus is a third communication apparatus.

3. The method according to claim 2, wherein before the performing, by the first communication apparatus, inference on the data based on a submodel corresponding to the first communication apparatus, to obtain an inference result, the method further comprises:

receiving, by the first communication apparatus, the submodel corresponding to the first communication apparatus from the third communication apparatus.

4. The method according to claim 1, wherein before the performing, by the first communication apparatus, inference on the data based on a submodel corresponding to the first communication apparatus, to obtain an inference result, the method further comprises:

receiving, by the first communication apparatus, the submodel corresponding to the first communication apparatus from the second communication apparatus.

5. The method according to claim 1, wherein before the receiving, by a first communication apparatus, first indication information from a second communication apparatus, the method further comprises:

sending, by the first communication apparatus, state information of the first communication apparatus to the second communication apparatus.

6. The method according to claim 5, wherein the state information of the first communication apparatus comprises one or more of the following: a size of storage space of the first communication apparatus, maximum computing power of the first communication apparatus, information about a resource occupied by the first communication apparatus, a device adjacency matrix of the first communication apparatus, a device state of the first communication apparatus, whether the first communication apparatus agrees to participate in inference, or a validity period of the state information of the first communication apparatus; and the device adjacency matrix of the first communication apparatus indicates a connection relationship between the first communication apparatus and another first communication apparatus.

7. The method according to claim 1, wherein before the receiving, by a first communication apparatus, first indication information from a second communication apparatus, the method further comprises:

receiving, by the first communication apparatus, a device selection result from the second communication apparatus, wherein the device selection result indicates that the first communication apparatus is selected; and sending, by the first communication apparatus to the second communication apparatus, an acknowledgment of the first communication apparatus for the device selection result.

8. The method according to claim 1, wherein before the receiving, by the first communication apparatus, data from the previous-hop communication apparatus of the first communication apparatus, the method further comprises:

receiving, by the first communication apparatus, first information from the second communication apparatus, wherein the first information comprises one or more of the following: information about a resource occupied by the previous-hop communication apparatus of the first communication apparatus, information about a resource occupied by the next-hop communication apparatus of the first communication apparatus, or time information, wherein the time information indicates a corresponding time range in which the first communication apparatus receives the data from the previous-hop communication apparatus of the first communication apparatus.

9. A split inference method, comprising:

generating, by a second communication apparatus, first indication information, wherein the first indication information indicates a previous-hop communication apparatus and a next-hop communication apparatus of a first communication apparatus, the previous-hop communication apparatus and the next-hop communication apparatus of the first communication apparatus each comprise at least one terminal device, the first communication apparatus is one of X communication apparatuses, a communication apparatus x in the X communication apparatuses corresponds to an $x^{th}$ submodel in X submodels, the X submodels are obtained by splitting a model, and the submodel is used for data inference, wherein x is greater than or equal to 1, and x is less than or equal to X; and sending, by the second communication apparatus, the first indication information to the first communication apparatus.

10. The method according to claim 9, wherein before the generating, by a second communication apparatus, first indication information, the method further comprises:

determining, by the second communication apparatus, the X communication apparatuses.

11. The method according to claim 10, wherein the determining, by the second communication apparatus, the X communication apparatuses comprises:

obtaining, by the second communication apparatus, state information of M communication apparatuses, wherein the state information indicates whether the first communication apparatus supports inference, X is greater than or equal to 1, and X is less than or equal to M; and selecting, by the second communication apparatus, the X communication apparatuses based on the state information of the M communication apparatuses.

12. The method according to claim 11, wherein the obtaining, by the second communication apparatus, state information of M communication apparatuses comprises:

broadcasting, by the second communication apparatus, a state information reporting request, wherein the state information reporting request is used to request the first communication apparatus to report the state information; and receiving, by the second communication apparatus, the state information from the M communication apparatuses.

13. The method according to claim 11, wherein state information of the first communication apparatus comprises one or more of the following: a size of storage space of the first communication apparatus, maximum computing power of the first communication apparatus, information about a resource occupied by the first communication apparatus, a device adjacency matrix of the first communication apparatus, a device state of the first communication apparatus, whether the first communication apparatus agrees to participate in inference, or a validity period of the state information of the first communication apparatus; and the device adjacency matrix of the first communication apparatus indicates a connection relationship between the first communication apparatus and another first communication apparatus.

14. The method according to claim 9, wherein the sending, by the second communication apparatus, the first indication information to the first communication apparatus comprises:

broadcasting, by the second communication apparatus, a device selection result, wherein the device selection result indicates the X communication apparatuses;

receiving, by the second communication apparatus, an acknowledgment of the first communication apparatus for the device selection result; and sending, by the second communication apparatus, the first indication information to the first communication apparatus based on the acknowledgment.

15. The method according to claim 9, wherein the method further comprises:

splitting, by the second communication apparatus, the model to obtain the X submodels; and respectively sending, by the second communication apparatus, the submodels corresponding to the communication apparatuses to the X communication apparatuses.

16. The method according to claim 15, wherein the splitting, by the second communication apparatus, the model to obtain the X submodels comprises:

broadcasting, by the second communication apparatus, a device selection result, wherein the device selection result indicates the X communication apparatuses;

receiving, by the second communication apparatus, acknowledgments of the X communication apparatuses for the device selection result; and splitting, by the second communication apparatus, the model based on the acknowledgments, to obtain the X submodels.

17. The method according to claim 10, wherein the determining, by the second communication apparatus, the X communication apparatuses comprises:

receiving, by the second communication apparatus, inference information from a third communication apparatus; and determining, by the second communication apparatus, the X communication apparatuses based on the inference information.

18. A split inference method, comprising:

sending, by a third communication apparatus, inference information to a second communication apparatus;

receiving, by the third communication apparatus, second indication information from the second communication apparatus, wherein the second indication information indicates a communication apparatus 1 and a communication apparatus X in X communication apparatuses, the X communication apparatuses are determined by the second communication apparatus based on the inference information, and X is greater than or equal to 1;

sending, by the third communication apparatus, data to the communication apparatus 1; and receiving, by the third communication apparatus, an inference result from the communication apparatus X.

19. The method according to claim 18, wherein the inference information comprises one or more of the following: a data amount size, data precision, a quantity of layers of a model, an input/output dimension of the model, floating-point operations of each layer of the model, a type of an inference task, a priority of the inference task, or a maximum split amount of the model, wherein the type of the inference task comprises a model type and a data type, the model type is private or public, and the data type is private or public.

20. The method according to claim 18, wherein the sending, by a third communication apparatus, inference information to a second communication apparatus comprises:

sending, by the third communication apparatus, an inference request to the second communication apparatus, wherein the inference request comprises the type of the inference task, and the inference request is used to request the second communication apparatus to perform the inference task;

receiving, by the third communication apparatus, an acknowledgment of the second communication apparatus for the inference request; and sending, by the third communication apparatus based on the acknowledgment, the inference information to the second communication apparatus.

\* \* \* \* \*